United States Patent

Saho et al.

[11] Patent Number: 6,103,113
[45] Date of Patent: Aug. 15, 2000

[54] MAGNETIC PURIFICATION APPARATUS

[75] Inventors: Norihide Saho, Tsuchiura; Hisashi Isogami; Minoru Morita, both of Ibaraki-ken, all of Japan

[73] Assignee: Hitachi, Ltd., Tokyo, Japan

[21] Appl. No.: 09/018,056

[22] Filed: Feb. 3, 1998

[30] Foreign Application Priority Data

Feb. 3, 1997 [JP] Japan ................................ 9-020219

[51] Int. Cl.⁷ .......................... B01D 35/06; B03C 1/08
[52] U.S. Cl. ........................ 210/222; 210/695; 96/1; 209/232
[58] Field of Search ................ 210/222.223, 695; 95/28; 96/1; 209/232

[56] References Cited

U.S. PATENT DOCUMENTS

| | | | |
|---|---|---|---|
| 4,141,687 | 2/1979 | Forrest et al. | 210/222 |
| 4,498,987 | 2/1985 | Inaba | 210/222 |
| 4,828,711 | 5/1989 | Cohen | 210/695 |
| 5,004,539 | 4/1991 | Colwell, Jr. | 210/222 |

FOREIGN PATENT DOCUMENTS

| | | |
|---|---|---|
| 0 083 331 A1 | 7/1983 | European Pat. Off. . |
| 0 169 774 A1 | 1/1986 | European Pat. Off. . |
| 59-371 | of 0000 | Japan . |
| WO/87/03511 | 6/1987 | WIPO . |

OTHER PUBLICATIONS

IEEE Transactions on Magnetics, vol. 26, No. 5, Sep. 1990, 3 pages.

*Primary Examiner*—David A. Reifsnyder
*Attorney, Agent, or Firm*—Evenson McKeown Edwards & Lenahan, P.L.L.C.

[57] ABSTRACT

A purification apparatus includes a first flow path for introducing and discharging water and magnetic field generation means provided on a way of in the flow path for giving a magnetic field in the flow path. The introduced water includes magnetic substances. In the flow path in which the magnetic field generation means is disposed and in the magnetic field generated by the magnetic field generation means, a second flow path is provided in such a manner that the second flow path is guided toward the outside from a region in which a magnetic gradient is decreased. Further, there are provided means for moving the magnetic substances in the vicinity of the second flow path, magnetic substance sensing means provided in the flow path, and control means for controlling in response to a signal from the sensing means an amount of the magnetic substances which flow through the second flow path.

23 Claims, 14 Drawing Sheets

MAGNETIC PURIFICATION APPARATUS

BACKGROUND OF THE INVENTION

1. Field of the Invention

The present invention relates to a magnetic separating purification apparatus, particularly to a purification apparatus which can continuously separate and remove magnetic substances easily.

2. Description of the Related Art

As an example of a technique for removing pollutants from water to purify the water, there is provided a magnetic separation technique. As the technique for use in a continuous water purification apparatus for seas, rivers, reservoirs or the like, Japanese Patent Unexamined Publication No. 59-371 discloses a magnetic separation apparatus using a high-gradient magnetic filter. The thus apparatus will be described later with reference to FIG. 11.

In such an apparatus, in preparation for a magnetic separation process, after raw water to be treated is taken, for example, iron tetroxide or another magnetic powder and alumina sulfate, polychlorinated aluminum or another flocculant are applied to the raw water and stirred. Solid floating substances, algae, fungi and microorganisms in the raw water are combined by the flocculant with magnetic flocks to form multiple colloidal magnetic aggregate or substances. When passing a magnetic separating portion, these magnetic substances are drawn by the separating portion and separated from the raw water. In the magnetic separating portion, the magnetic substances in the raw water are caught by a large magnetic force on a high-gradient filter surface, and purified water is discharged as treated water.

In the prior art, the magnetic substances are caught by the filter. Therefore, when a certain or more amount of magnetic substances are caught, a capture force given by means of magnetic force is weakened due to piling of the magnetic substances on the filter. Then, to recover the performance of magnetic separation, the filter is subjected to backwashing, and the magnetic substances caught on the filter surface are washed and removed. At this time, the magnetic force for adsorbing the magnetic substances is eliminated or lowered to enhance the washing efficiency.

However, in the above conventional apparatus, it is difficult to perform the magnetic separation during the backwashing. Also, it is not easy to wash the magnetic substances out of fine portions of the high-gradient magnetic filter. It takes much time to perform backwashing while stopping the magnetic separating operation, which largely deteriorates the efficiency of the purification process. Thus, in the conventional apparatus, the problem that the backwashing lowers the efficiency of the entire process has not been considered.

Also, the following problem has not been considered. If time interval between the backwashing operations is lengthened so as to increase the purification efficiency, a space has to be enlarged for accumulating and storing the caught magnetic substances in the vicinity of the filter. Since the volume of the magnetic separating portion is enlarged, an electromagnet is enlarged in size or has to generate a large magnetic force. Therefore, electric power for operating the large-sized electromagnet is increased.

As aforementioned, in the prior art of catching magnetic bodies with the filter, the filter needs to be subjected to backwashing to remove the caught magnetic bodies from the filter. Therefore, the filter cannot be disposed in a backwashing direction. It is difficult to provide plural magnetic separating portions in one apparatus. A flow rate to be treated has a limitation.

SUMMARY OF THE INVENTION

The present invention has been made to solve the aforementioned problems of the prior art, and an object thereof is to provide a purification apparatus which can efficiently perform purification with a small demand power.

To attain the above and other objects, the invention provides a purification apparatus which continuously separates and removes all or part of magnetic substances.

Specifically, the purification apparatus is provided with a magnetic separation means having magnetic field generation means for generating a magnetic field in water to be treated including magnetic substances and separating the water into the magnetic substances and the treated water, an introducing flow path for guiding the water to be treated into the magnetic separation means and a discharge flow path for discharging the treated water from the magnetic separation means. The purification apparatus also includes conveyance means for discharging the magnetic substances to the outside of the flow paths.

Also, means for moving the magnetic substances is provided in the vicinity of the conveyance means. Further, a flow path of raw water may be disposed on an outer peripheral portion of the magnetic field generation means.

Also, the purification apparatus may be provided with magnetic substance sensing means provided in the flow path of raw water and control means for controlling a discharge amount of the conveyance means in response to a signal from the sensing means. Further, the purification apparatus may be provided with sensing means provided on the downstream side of the treated water for sensing the magnetic substances or additives or additive elements, and flow rate control means for controlling a flow rate of raw water in response to a signal from the sensing means, or magnetic control means for controlling the magnetic field generated by the magnetic field generation means.

Also, in the flow path in which the magnetic field generation means is disposed, a plurality of regions in which a magnetic gradient is increased are generated. Plural second flow paths may be provided in each of the magnetic fields generated by the magnetic field generation means.

Further, in the flow path in which the magnetic field generation means is disposed, a plurality of regions in which a magnetic gradient is increased are generated. A plurality of second flow paths are provided in respective magnetic fields generated by the magnetic field generation means. The second flow paths may be guided to the outside thereof from a region in which the magnetic gradient is decreased between the regions in which the magnetic gradient is increased.

Also, the flow path in which the magnetic field generation means is disposed substantially perpendicular to the first flow path, and the second flow path may be provided in the flow path for discharging the magnetic substances in the region in which the magnetic gradient is increased from the region in which the magnetic gradient is decreased.

Further, the second flow path may be disposed substantially perpendicular to the first flow path, the magnetic field generation means is provided in such a manner that the region in which the magnetic gradient is increased is generated, and the second flow path is guided to the outside for discharging the magnetic substances in the region in which the magnetic gradient is increased from the region in which the magnetic gradient is decreased.

Also, the first flow path includes two flow paths which are interconnected with each other via the flow path in which the magnetic field generation means is disposed. In the flow path in which the magnetic field generation means is disposed, the region in which the magnetic gradient is increased is generated. The second flow path is provided in the magnetic field generated by the magnetic field generation means. The second flow path may be guided to the outside from the region in which the magnetic gradient is decreased.

Operation of the above constitution will be described below.

A magnetic attraction force generated in the magnetic separating portion is represented by (magnetic intensity)×(magnetic susceptibility of magnetic substances)×(amount of magnetic substances)×(magnetic gradient). Therefore, even if there is no magnetic filter, the magnetic gradient is generated in a raw water flow path at an inlet/outlet portion of the electromagnet. At the portion, the magnetic substances in the raw water are drawn and caught. In a place where the magnetic substances are caught, a discharge pipe is disposed and connected to the outside of the magnetic separating portion to continuously discharge the caught magnetic substances to the outside of the magnetic separating portion. In this case, power of the electromagnet for generating the magnetic field does not need to be cut off. Since there is no filter which becomes a resistance or obstruction when the caught magnetic substances are washed back without being drawn, the caught magnetic substances can be conveyed in a short period of time, thereby enhancing a purifying operation efficiency.

Also, when as the electromagnet, a superconductive magnet of a niobium titanium system, a niobium-3-tin system, a niobium-3-aluminum system, a bismuth system, a thallium system or another high-temperature superconductive system is used, the demand power for generating the magnetic field can be minimized. In the continuous separation method, the power supply of the electromagnet does not need to be operated during run. Therefore, during the separating operation, a permanent current operation is feasible. Therefore, during the operation, a current supply cable can be mechanically separated from the magnet having a very low temperature. Heat is prevented from entering the superconductive magnet from a room temperature portion. Therefore, a consumption of liquid helium, liquid nitrogen or another cooling medium can be reduced. When cooling is performed in a refrigerator, the consumed power of the refrigerator can be reduced. The refrigerator can be made small.

Further, the magnetic separation means having the magnetic filter and the flow path for supplying the treated water to the magnetic separation means are provided on the downstream side of the treated water. Therefore, the magnetic substances included in the water to be treated which flows in the magnetic separating portion provided with the conventional magnetic filter are reduced in size and in the amount thereof. A period of time is elapsed until the filter is clogged and requires to be cleaned, i.e., a cleaning cycle is remarkably lengthened. Further, by dividing the magnetic separation means in accordance with the sizes of the magnetic substances in the raw water, the water to be treated can be passed at a high speed. The apparatus can be made remarkably small. Also, even when the magnetic separating portion and the magnetic separating portion with the high-gradient magnetic filter built therein are disposed in the magnetic field of the same electromagnet, the same effect can be obtained.

Further features of the invention will be apparent from the appended claims and the following description.

DETAILED DESCRIPTION OF THE PREFERRED EMBODIMENTS

Embodiments of the present invention will be described below with reference to the accompanying drawings.

[First Embodiment]

A first embodiment of the invention will be described with reference to FIGS. 1 to 3.

Figure 1:
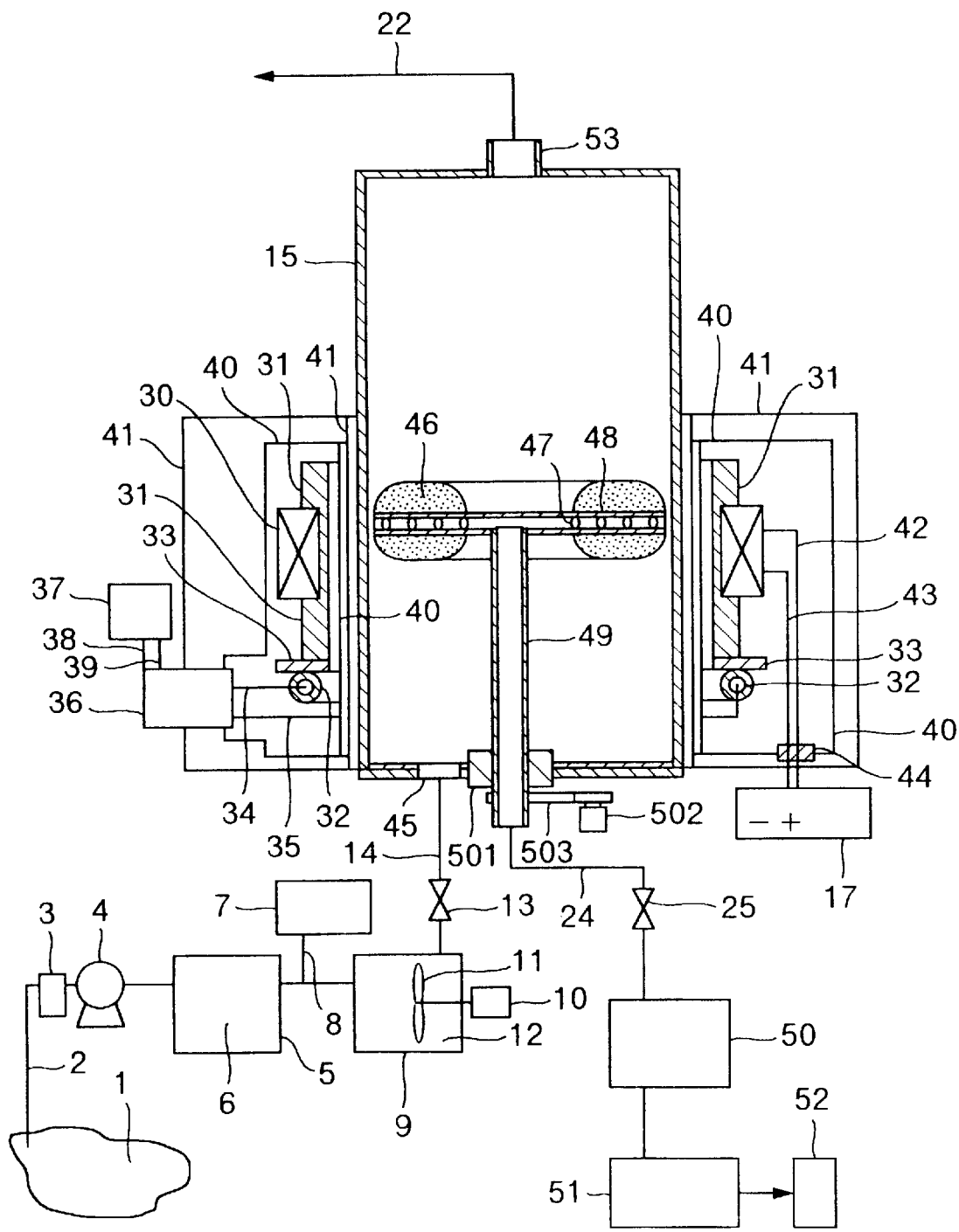
FIG. 1 is a vertical sectional view showing a schematic constitution of a purification apparatus and a magnetic separating portion according to a first embodiment of the invention.
Figure 2:
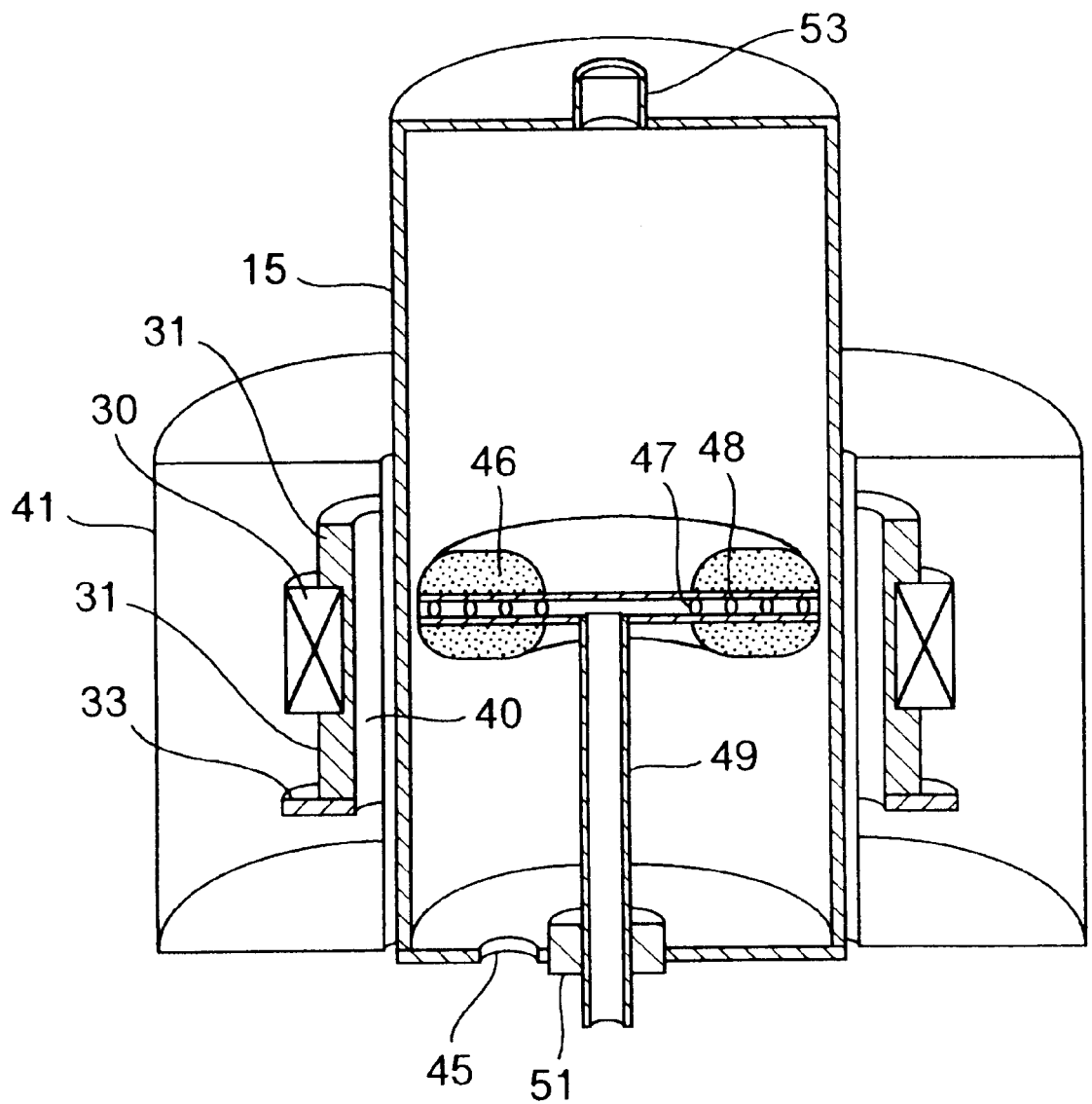
FIG. 2 is an illustration of a condition in which magnetic substances are caught in the purification apparatus shown in FIG. 1.

FIG. 1 is a vertical sectional view diagrammatically showing an entire constitution of a purification apparatus and a magnetic separating portion in the first embodiment. FIG. 2 shows a condition in which magnetic substances are caught in the purification apparatus shown in FIG. 1. Further, FIG. 3 is a longitudinal sectional view showing an example of distribution of magnetic flux density of an electromagnet.

First, with reference to FIG. 3, a magnetic field generated in the vicinity of a cylindrical (donut-shaped) electromagnet of the invention will be described.

Figure 3:
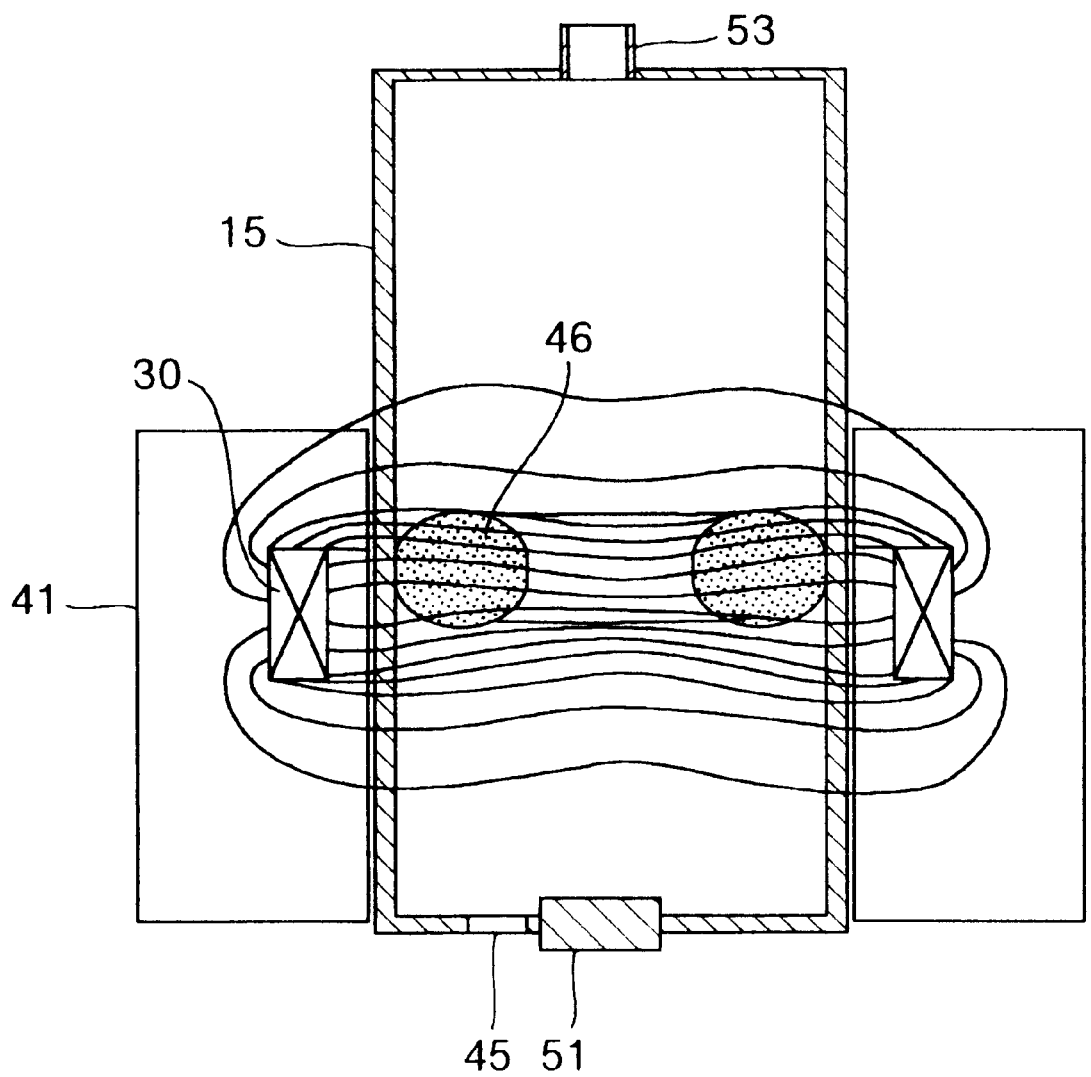
FIG. 3 is an illustration of a distribution of a magnetic flux density in the purification apparatus of FIG. 1.

An electromagnet disposed on an outer periphery of a magnetic separation container 15 generates a magnetic field shown in FIG. 3. FIG. 3 shows the distribution of the magnetic field as the distribution of magnetic flux density. In the magnetic field, a magnetic intensity is determined by a current value of the electromagnet and the winding number of a coil. As shown in FIG. 3, in the cylindrical (donut-shaped) electromagnet 30, the magnetic field is the strongest in an inner central portion of the cylindrical magnet, and rapidly decreased toward an outer portion in an axial direction of the cylinder. Therefore, a magnetic gradient reaches its maximum in a portion of the cylindrical magnet open to the atmosphere, i.e. in the vicinity of a circumferential portion of the cylinder. In the magnetic separation container 15, a large magnetic gradient is generated at an inlet/outlet portion of the electromagnet in a direction in which water to be treated flows. The magnetic gradient becomes maximum on an inner wall face of the magnetic separation container 15 which corresponds to the inlet/outlet portion of the electromagnet. Specifically, magnetic substances are easily gathered or caught on the inner wall face.

A magnetic attraction force generated in the magnetic separating portion is represented by (magnetic intensity)×(magnetic susceptibility of magnetic substances)×(amount of magnetic substances)×(magnetic gradient). In FIG. 3, the water to be treated including the magnetic substances flows into an inlet port 45 of the magnetic separating portion and out of an outlet port 53. At this time, the magnetic substances in the water to be treated are attracted by the magnetic field of the electromagnet 30 toward the central portion of the electromagnet 30. In this case, a magnetic force is exerted toward the inlet/outlet portion (circumferential end) of the electromagnet 30 in which magnetic force and magnetic gradient are both large. The magnetic substances gather on the inner face of the magnetic separation container 15 which is close to the inlet/outlet portion. Here, if the magnetic force exerted on the magnetic substances is larger than a drag of fluid exerted for pushing out the magnetic substances, the magnetic substances stay at the portion. As shown in FIGS. 1 to 3, the magnetic substances are retained or caught in a donut shape in a region 46 of a flow path.

A constitution of the vicinity of the electromagnet 30 for use in the invention will be described with reference to FIG. 2.

In the first embodiment, a superconductive magnet is used for the electromagnet, and the cylindrical superconductive magnet 30 is wound around a bobbin 31. The bobbin 31 is made of stainless steel, copper, aluminum alloy, reinforced epoxy resin, a combination of these materials or the like. The material is selected in such a manner that the bobbin 31 has a high rigidity, a good thermal conductivity and a small heat capacity.

On a portion of the bobbin 31, a cooling pipe 32 and a cooling plate 33 are thermally integrally formed. The cooling pipe 32 is connected via pipings 34 and 35 to a refrigerator 36. The refrigerator 36 is an apparatus which uses helium, nitrogen, air, hydrogen, fleon system gas or another cooling medium or an electronic apparatus which uses Peltier element. The compressed cooling medium is supplied from an air-cooling or water-cooling compressor 37 via a piping 38 into the refrigerator 36 in which insulation is performed and coldness is generated. The cooling medium in a low-pressure condition returns via a piping 39 back to the compressor 37. The refrigerator using gas as an operating fluid is an apparatus which uses Gifford MacMahon system, Solvay process, Stirling's formula, Pastle pipe, Collins expander, an expansion turbine, an expansion valve, a combination of these or the like. The coldness generated in the refrigerator 36 is conveyed through the cooling pipe 32 to cool the cooling plate 33 and indirectly cool the superconductive magnet 30 to a superconductivity generation temperature or a lower temperature. Around the superconductive magnet 30, a thermal shield 40 which is cooled to an intermediate level between a normal temperature and the superconductivity generation temperature is disposed to prevent conduction of radiant heat from a normal temperature portion to the superconductive magnet or heat from a magnet support or a current lead wire.

Further, a constitution of an apparatus for cooling the electromagnet 30 according to the invention will be described with reference to FIG. 1.

The thermal shield 40 which also serves as an inner wall of a vacuum container 41 is cooled by coldness which has an intermediate temperature between the coldness generated by the refrigerator 36 and the normal temperature. Constituent elements are housed in the vacuum container 41. Current lead wires 42 and 43 are cooled by the thermal shield 40 through an insulator having an electric insulating property and a good thermal conductivity, e.g., an insulator 44 made of sapphire, and indirectly cooled by the coldness which has the intermediate temperature between the coldness generated by the refrigerator 36 and the normal temperature.

With reference to FIG. 1, a flow of treated water in the magnetic separating portion of the purification apparatus according to the invention will be described. The previously treated water 12 including magnetic flocks or substances flows through the inlet port 45 into the magnetic separation container 15 and further flows upward as seen in the drawing. Here, as aforementioned, the magnetic substances have a large magnetic gradient, and the magnetic force acting on the magnetic substances is exerted in a direction in which the magnetic substances are inhibited from flowing. The magnetic substances are thus caught in the region 46 in which the magnetic force becomes larger than a fluid force acting on the magnetic substance, and floated in the flow path.

The region 46 is provided with a suction pipe 48 in which bores 47 are made for drawing the caught magnetic substances to be discharged to the outside. The magnetic substances are drawn by the suction pipe 48, and passed through a discharge pipe 49 toward a piping 24. The discharge pipe 49 is separated from the atmosphere by a water-tight seal portion 501. The suction pipe 48 and the discharge pipe 49 are rotated by a motor 502 and a belt 503 to draw the magnetic substances from the region 46. When the caught magnetic substances are drawn, a pressure difference is given between inlet and outlet ports of the piping in such a manner that a speed is generated for generating a peeling force which is larger than the magnetic force for catching the magnetic substances. Therefore, the magnetic substances can be removed through the suction pipe 48 having the bores 47 and the associated exhaust pipe 49. A result of an experiment conducted by inventors et al. shows that a sufficient suction or discharge flow rate is 20 cm per second. Further, without stopping applying or weakening the magnetic field onto the magnetic separating portion to change the operation of the apparatus, the magnetic substances can be continuously removed from the magnetic separation container.

The removed magnetic substances are passed though the piping 24 and a valve 25 and stored in a concentrated sludge tank 50. As the power for drawing and discharging the magnetic substances, a pressure difference between the atmosphere and the flow path can be used. Alternatively, the magnetic substances may be drawn by reducing the inner pressure of the concentrated sludge tank 50 to be less than the inner pressure of the flow path with a vacuum discharge apparatus or the like.

Concentrated sludge is thrown from the concentrated sludge tank 50 into a rotating drum, and water is removed from the sludge by a centrifugal separator or another dewatering measure 101 which is rotated to separate the magnetic substances from water by using a condition that the density of the magnetic substances is larger than that of water. The sludge is then conveyed to an after-treatment apparatus 102 which has functions of drying, collecting magnetic powder, composting and the like. The treated water with the magnetic substances separated or removed therefrom is passed through the outlet port 53 and a piping 22 back to a reservoir 1.

In the embodiment constituted as described above, the magnetic substances in the raw water are continuously caught and kept in the magnetic space created by the electromagnet itself. The magnetic substances are drawn by the suction pipe and discharged to the outside of the magnetic separating portion. In this case, while performing magnetic separation, the continuously caught magnetic substances can be separated and removed. The magnetic separating portion uses no filter. Therefore, an operation of regenerating a filter and the backwashing process for washing away the caught magnetic substances are unnecessary. Thus, the operation efficiency can be enhanced. Also, since the magnetic substances can be continuously removed, the caught magnetic substances do not need to be held in the magnetic separating portion until the backwashing is performed. A space for holding the magnetic substances in the magnetic separating portion can be minimized, which can reduce the entire space in the magnetic separating portion. Consequently, the length of the central portion of the electromagnet in the magnetic field direction can be shortened. By shortening the length of the electromagnet, the electromagnet can be advantageously made small.

In the embodiment, the electromagnet is cooled through the cooling pipe by the refrigerator. Alternatively, even when a coldness portion of the refrigerator is thermally integrally formed directly on an end of the electromagnet for cooling, the same effect can be obtained. Also, even when the electromagnet is cooled by liquid helium, liquid nitrogen, liquefied fleon or another very low or low temperature cooling medium, the same effect can be obtained.

Further, the purification apparatus according to the invention can be used for purifying the raw water including zooplankton or phyto-plankton, organic or inorganic substances, heavy metal substances, chemical substances or the like such as sea water, river water, lake or marsh water, industrial waste water, storm sewage from a waste disposal plant, sewage, smoke and soot wash water or another water to be treated.

To change heavy metals in waste water into magnetic substances, the waste water is acid or alkali-treated and, for example, iron hydroxide and air serving as an oxidizing agent is applied to the waste water, and the temperature thereof or the like is adjusted so as to make a chemical reaction therein. In this manner, magnetic substances are formed in the waste water including heavy metals.

Further, in the case where a superconductive magnet is used as the electromagnet in the embodiment, by once magnetizing the magnet at the time of starting operation and running at a permanent current, a current cable connected from the normal temperature portion to the very low temperature portion can be once disconnected because a power supply system is unnecessary. Therefore, heat is prevented from being conducted from the normal temperature portion through the current cable into the very low temperature portion. Further, the power of the refrigerator for cooling the superconductive magnet or the consumption amount of the cooling medium can be advantageously reduced.

Also, in the first embodiment, the magnetic substances are discharged in the upstream direction of the previously treated water, but can be discharged in the downstream direction to obtain the same effect. That is, this discharging is possible in all the direction of the treated water.

Additionally, the discharge pipe 49 may be formed of iron and steel or another magnetic material. In this case, the magnetic gradient in the discharge pipe is reduced, and the power for conveying the magnetic substances is advantageously minimized. Further, the discharge pipe 49 may be constituted of a permalloy or another magnetic shield material or a superconductive material which is cooled to a superconductivity generation temperature or a lower temperature. Also in this case, the magnetic gradient in the discharge pipe is reduced, and the power for conveying the magnetic substances is advantageously minimized.

Also, in the first embodiment, the case where the separated magnetic substances are continuously drawn and discharged has been described. If there are a small amount of magnetic substances, however, even by intermittently drawing and discharging the magnetic substances, the same effect as described above can be generated. Also, instead of providing the suction means, the magnetic field generated by the electromagnet is reduced or the flow rate of backwashing water is increased. Then, the purification operation is intermittently stopped, and the caught magnetic substances may be discharged out of the magnetic separation container in a short time.

Also, when portions of the current lead wires 42 and 43 between the electromagnet 30 and the insulator 44 are constituted of a superconductive material, an electric resistance during energizing is eliminated, and no heat is generated therebetween. The electromagnet 30 and the thermal shield plate 40 can be cooled to a lower temperature. The electromagnet 30 can be advantageously operated stably.

[Second Embodiment]

Figure 4:
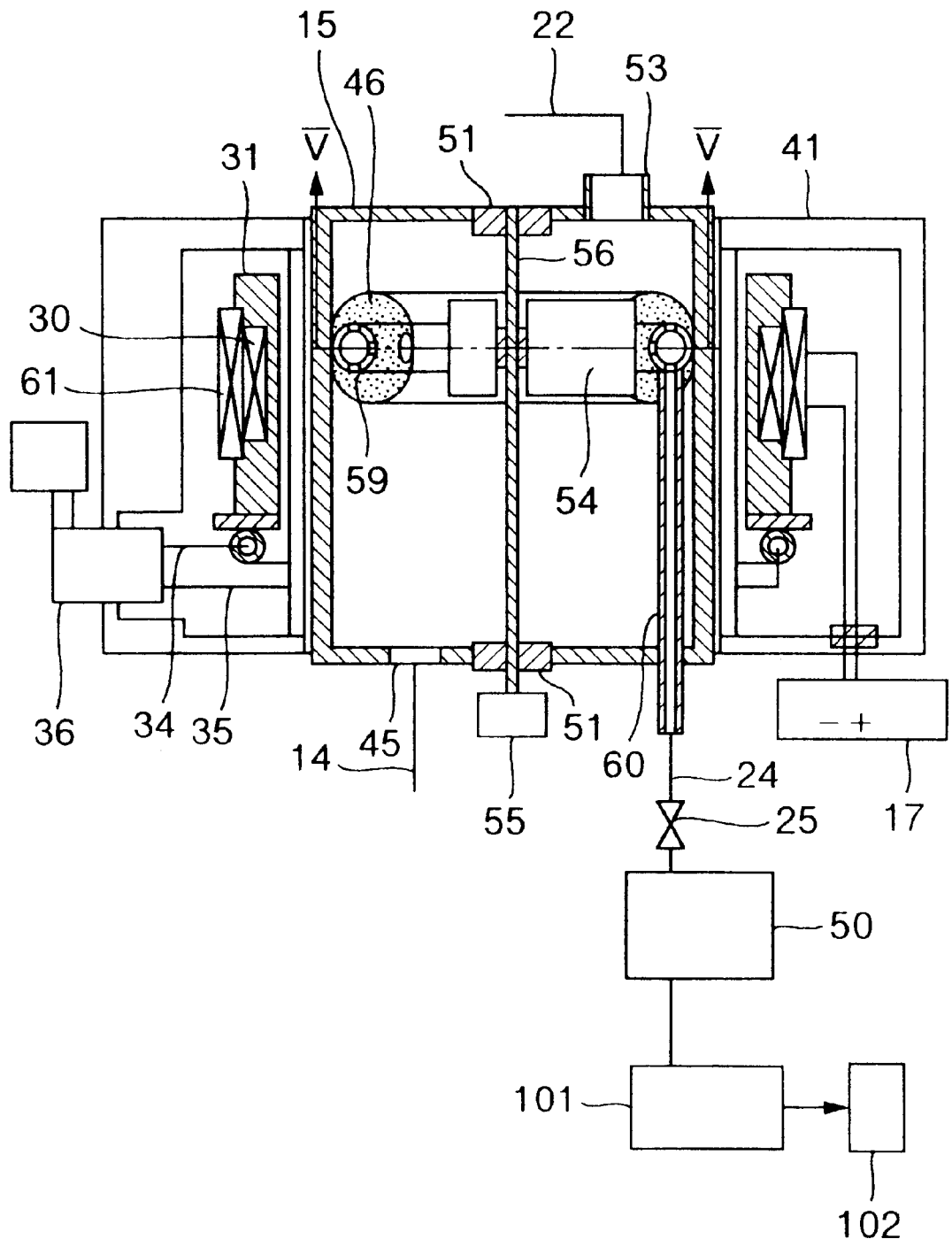
FIG. 4 is a longitudinal sectional view of a magnetic separating portion of a purification apparatus according to a second embodiment of the invention.
Figure 5:
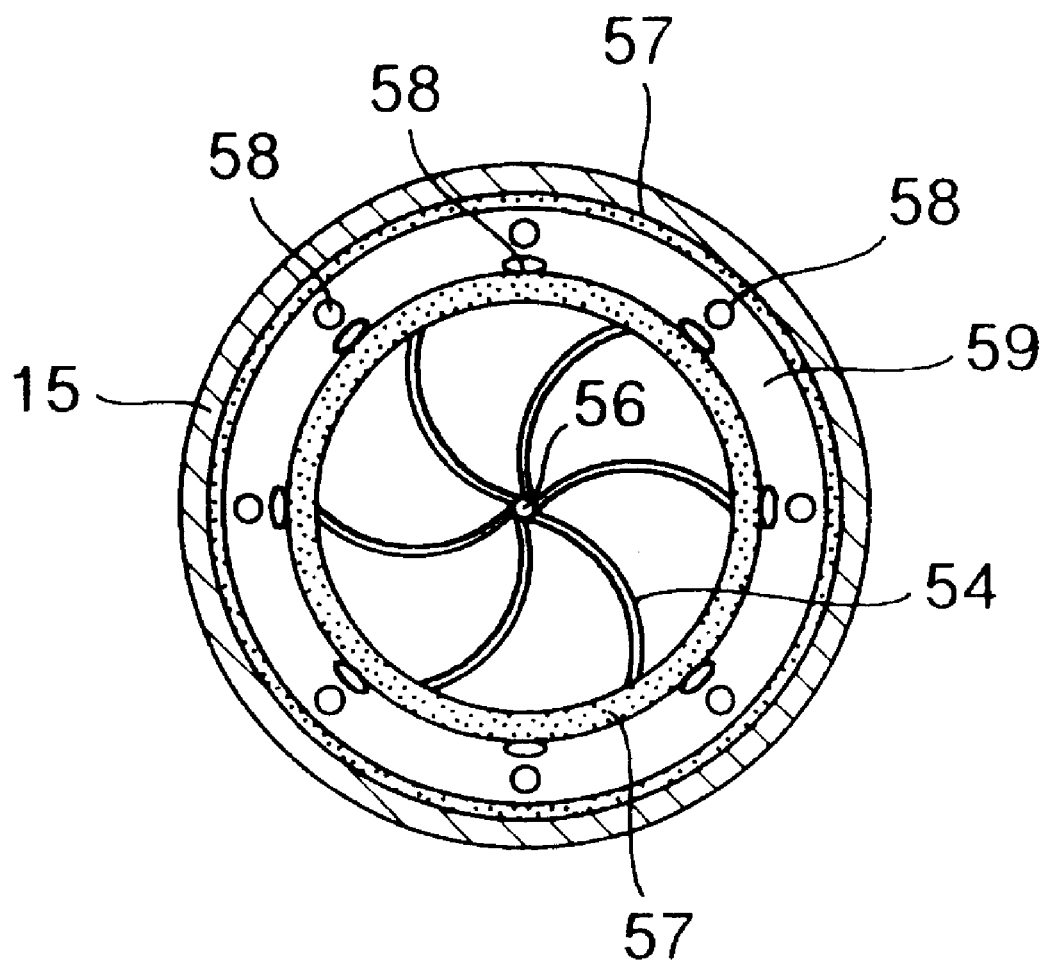
FIG. 5 is a cross-sectional view of a collecting plate for use in the magnetic separating portion as taken along line V—V in FIG. 4.

A second embodiment of the invention is shown in FIGS. 4 and 5. FIG. 4 is a longitudinal sectional view of a magnetic separating portion in a purification apparatus according to the second embodiment. FIG. 5 is a transverse sectional view of a collecting plate for use in the purification apparatus shown in FIG. 4.

The second embodiment is different from the embodiment shown in FIG. 1 in that the magnetic substance capture region 46 in FIG. 1 is provided with a rotary collecting plate 54 made of ceramic, plastic, stainless steel, aluminum alloy or another non-magnetic material or a low conductive material for collecting magnetic substances in a circumferential direction. The rotary collecting plate 54 is rotated by a motor 55 or a rotation axis 56 connected to the collecting plate 54.

The flow rate of the water to be treated flowing in the magnetic separation container 15 becomes the largest in the central portion of the container and the smallest on the wall face thereof. Therefore, the fluid resistance acting on the magnetic substances is the largest in the middle of the container. When the magnetic force generated by the electromagnet 30 is smaller as compared with the inner diameter of the magnetic separation container 15, in some case the magnetic substances in the water to be treated flowing through the central portion of the container cannot be caught. On the other hand, when the magnetic intensity generated by the electromagnet 30 is larger as compared with the inner diameter of the magnetic separation container 15, a uniform magnetic force is exerted on the magnetic substances in the water to be treated in an inner-diameter direction of the magnetic separation container 15. The magnetic substances are caught and floated even in the central portion of the container 15. Also in this case, the magnetic substances flowing through the central portion of the container 15 cannot be caught by means of the magnetic force of the electromagnet 30.

In the invention there is provided no mechanical capture means like the filter for catching magnetic substances inside the magnetic separation container 15. Therefore, in order to increase the amount of caught magnetic substances and the efficiency of magnetic separation, the magnetic substances flowing through the central portion of the magnetic separation container 15 have to be efficiently collected. To solve the inevitable problem, the magnetic substances in the central portion need to be moved to a region in which the suction pipe is installed or to an inner wall face of the container 15 on which the magnetic force is larger. In the second embodiment, as shown in FIGS. 4 and 5, the rotary collecting plate 54 is provided in the magnetic separation container 15. The rotation axis connected to the collecting plate 54 is rotated by the motor or another rotating means, so that the magnetic substances are moved in the peripheral direction of the inner wall face of the container 15 on which a suction pipe 59 is installed. A collected region 57 is provided with the annular suction pipe 59 which has bores 58 therein. The magnetic substances are passed through a discharge pipe 60 associated with the suction pipe 59, and continuously stored in the concentrated sludge tank 50.

FIG. 5 shows a cross section of the rotary collecting plate 54 and the annular suction pipe 59 seen from the above. In the magnetic substance capture region 46, since the magnetic gradient in the radial direction is small, the magnetic substances are moved in the radial direction with a slight force. The surface configuration of the collecting plate 54 is determined in such a manner that the collecting plate 54 is rotating to move the magnetic substances in the magnetic substance capture region 46 from its rotation center in the circumferential direction and a normal line to the surface is constantly directed in an outer peripheral direction. In the magnetic substances on the surface of the collecting plate 54 with the determined configuration, a force constantly directed to a radial outward direction is generated by rotation of the collecting plate 54. The force allows the magnetic substances to gather toward the inner surface of the magnetic separation container 15.

In the second embodiment, since the magnetic substances are continuously drawn through the bores 58 and caught in the circumferential direction by the rotary collecting plate 54, the amount of the magnetic substances which constantly float in the central portion of the rotary collecting plate 54 is reduced, and the flow resistance of the raw water including the magnetic substances is also reduced. Therefore, the power for passing the treated water can be minimized. For example, a power required for a pump to operate the treated water is reduced. The flow resistance of the floating magnetic substances is also reduced. Consequently, the magnetic gradient generated by the magnet can be minimized, and the electromagnet 30 can be effectively made small.

In the second embodiment, the magnetic substances are collected by the collecting plate 54 toward the inner surface of the container 15. Alternatively, by rotating the collecting plate 54 in reverse, the magnetic substances may be collected in the central portion and discharged from the central portion to the outside. In this case, the discharge pipe 49 shown in FIG. 2 can be used.

Also, the rotation axis 56 connected to the rotary collecting plate 54 shown in FIG. 4 may be partially provided with a rotary wing 60 which rotates around the rotation axis 56 when the raw water flows. In this case, both ends of the rotation axis 56 are supported by water-tight seal portions 51. One of the ends may be exposed to the atmosphere, so that the rotation can be visually checked. The rotary wing is rotated by the treated water which flows in, thereby rotating the rotary collecting plate 54. In this case, the motor for rotating the rotary collecting plate 54 is unnecessary.

Additionally, as shown in FIG. 4, by disposing magnetic cancel coil 61 on the outer peripheral portion of the electromagnet 30, a magnetic field may be generated in the reverse direction of the magnetic field generated by the electromagnet 30. The magnetic cancel coil can prevent the magnetic field in the electromagnet 30 from leaking outside, while increasing the magnetic gradient of the electromagnet 30 to reinforce the magnetic substance capture force and enlarge the capture region. By reducing the leaking magnetic field, in case of using in the refrigerator 36 including electrical parts the influence of the magnetic field can be reduced. The refrigerator can be positioned closer, and the cooling pipings 34 and 35 are shortened. Therefore, the amount of the radiant heat or the like which enters these pipings as a thermal load is reduced. The refrigerating capacity of the refrigerator can be effectively used for cooling the electromagnet. The constitution described above may be applied not only to the second embodiment but also to all the other embodiments of the invention to provide the same effect.

[Third Embodiment]

Figure 6:
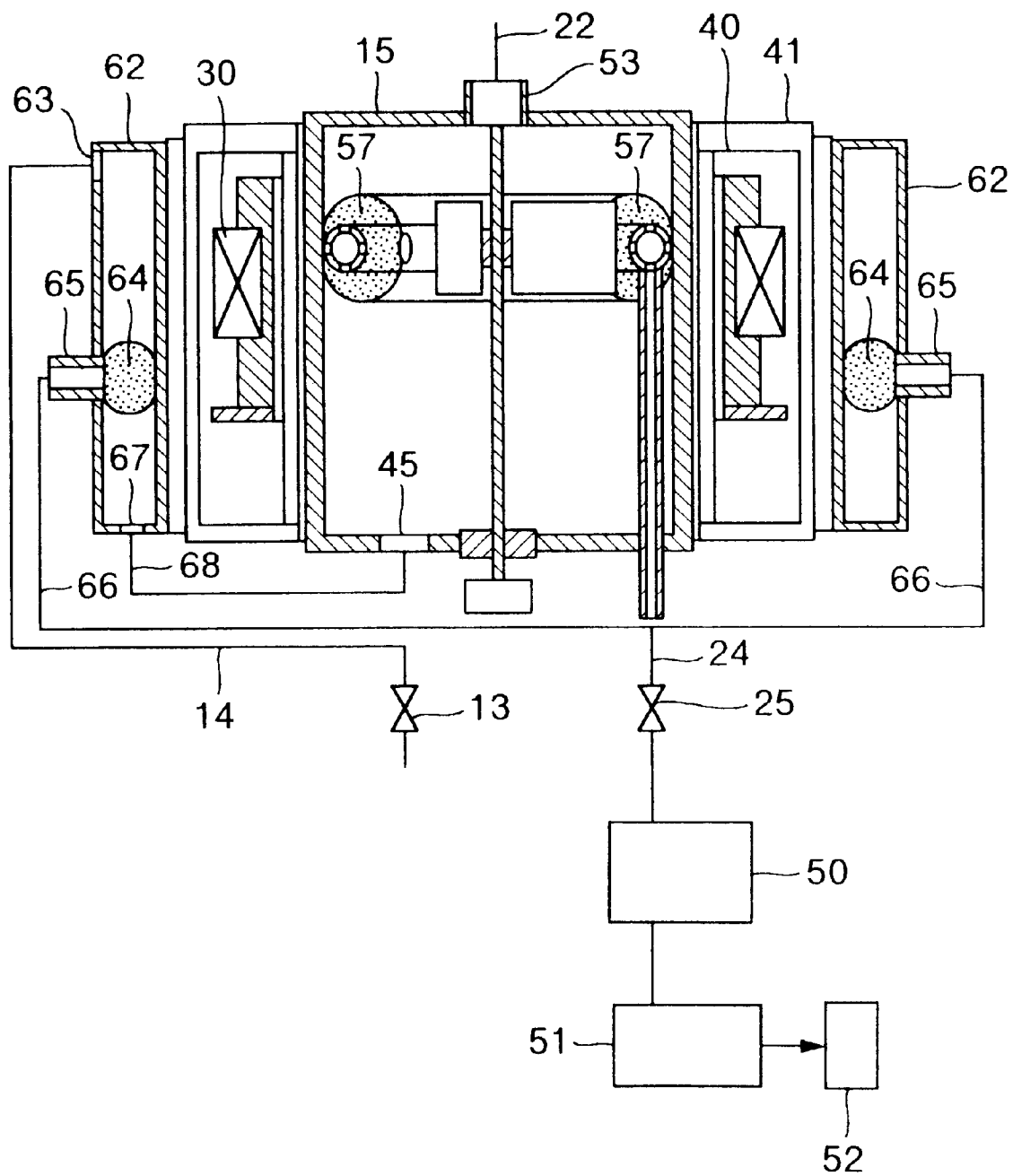
FIG. 6 is a longitudinal sectional view of a magnetic separating portion of a purification apparatus according to a third embodiment of the invention.

A third embodiment of the invention is shown in FIG. 6. FIG. 6 is a longitudinal sectional view of a magnetic separating portion in a purification apparatus according to the third embodiment of the invention.

The third embodiment is different from the first and second embodiments in that there is provided a cylindrical preparatory flow path 62 of the previously treated water on the outer peripheral portion of the vacuum container 41. The previously treated water is passed through an inlet port 63 into the preparatory flow path 62. By using the magnetic gradient of the magnetic field outside the electromagnet 30, the magnetic substances caught in the magnetic substance capture region 64 are passed through a nozzle 65 and a discharge pipe 66 to the concentrated sludge tank 50 to be stored therein.

The water before treated from which the magnetic substances are removed to some degree is passed through an outlet port 67 and a piping 68, then through the inlet port 45 into the magnetic separation container 15. The remaining magnetic substances are caught in the donut-shaped region 57, and drawn and removed through multiple nozzles 65 and discharge pipes 66 which are positioned on the circumference.

In the third embodiment, large-sized magnetic substances, i.e., the magnetic substances with a larger magnetic force are caught in the preparatory flow path, then magnetically separated again in the magnetic separation container 15. Two-stage separation process is performed. Therefore, the capture efficiency can be enhanced. The above inventive concept of the third embodiment can be applied to all the other embodiments of the invention, and can provide the same effect in the other embodiments.

In the third embodiment, the two-stage magnetic separation is performed. Alternatively, by disposing the preparatory flow path in parallel with the flow path in the magnetic separation container, the water before treated may be passed in parallel through both the paths. Therefore, since a flow path area is enlarged, a larger amount of treated water can be effectively purified. By making uniform the amount of the treated water, the electromagnet can be effectively made smaller.

[Fourth Embodiment]

Figure 7:
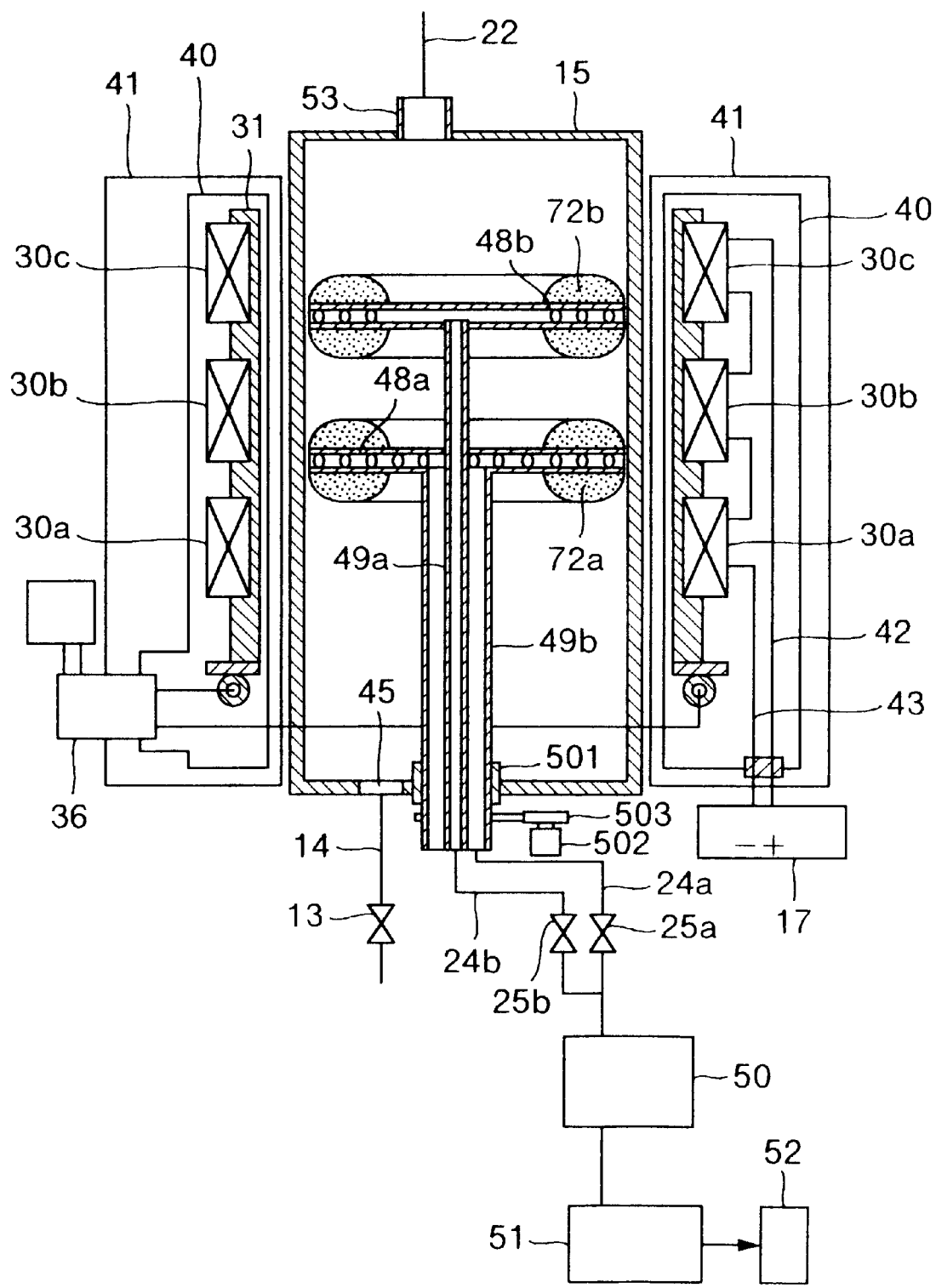
FIG. 7 is a longitudinal sectional view of a magnetic separating portion of a purification apparatus according to a fourth embodiment of the invention.

A fourth embodiment of the invention is shown in FIG. 7. FIG. 7 is a vertical sectional view of a magnetic separating portion in a purification apparatus according to the fourth embodiment.

The fourth embodiment is different from the above embodiments in that electromagnets 30a, 30b and 30c are disposed on the same bobbin 31 in such a manner that magnetic fields are directed in reverse to one another. In a longitudinal direction in the magnetic separation container 15, i.e., in the flowing direction of the water before treated, there is generated one or a plurality of regions 72a and 72b in which a magnetic gradient is increased.

The previously treated water 12 including magnetic flocks or substances flows from the inlet port 45 into the magnetic separation container 15, and further flows upward as seen in the drawing. Here, the magnetic substances are caught in the regions 72a and 72b in which the magnetic gradient is large and the magnetic substances are inhibited from flowing, and caught and kept in a flow path. The caught magnetic substances are passed through perforated suction pipes 48a and 48b and associated discharge pipes 49a and 49b, continuously removed from the magnetic separation container, and further passed through pipings 24a and 24b and valves 25a and 25b, respectively, to the concentrated sludge tank 50 to be stored therein.

The discharge pipes are separated from the atmosphere by the water-tight seal portion 501. The suction pipes and the discharge pipes are rotated by the motor 502 and the belt 503 to draw the magnetic substances from the regions 72a and 72b.

In the fourth embodiment, in the regions 72a and 72b which generate the magnetic fields in reverse, a large magnetic gradient is generated, the capture force of the magnetic substances is remarkably increased, the capture efficiency is enhanced, and the capture force is reinforced. Consequently, the passing rate of the previously treated water in the magnetic separation container 15 can be increased, and the treated amount of raw water can also be increased.

Figure 8:
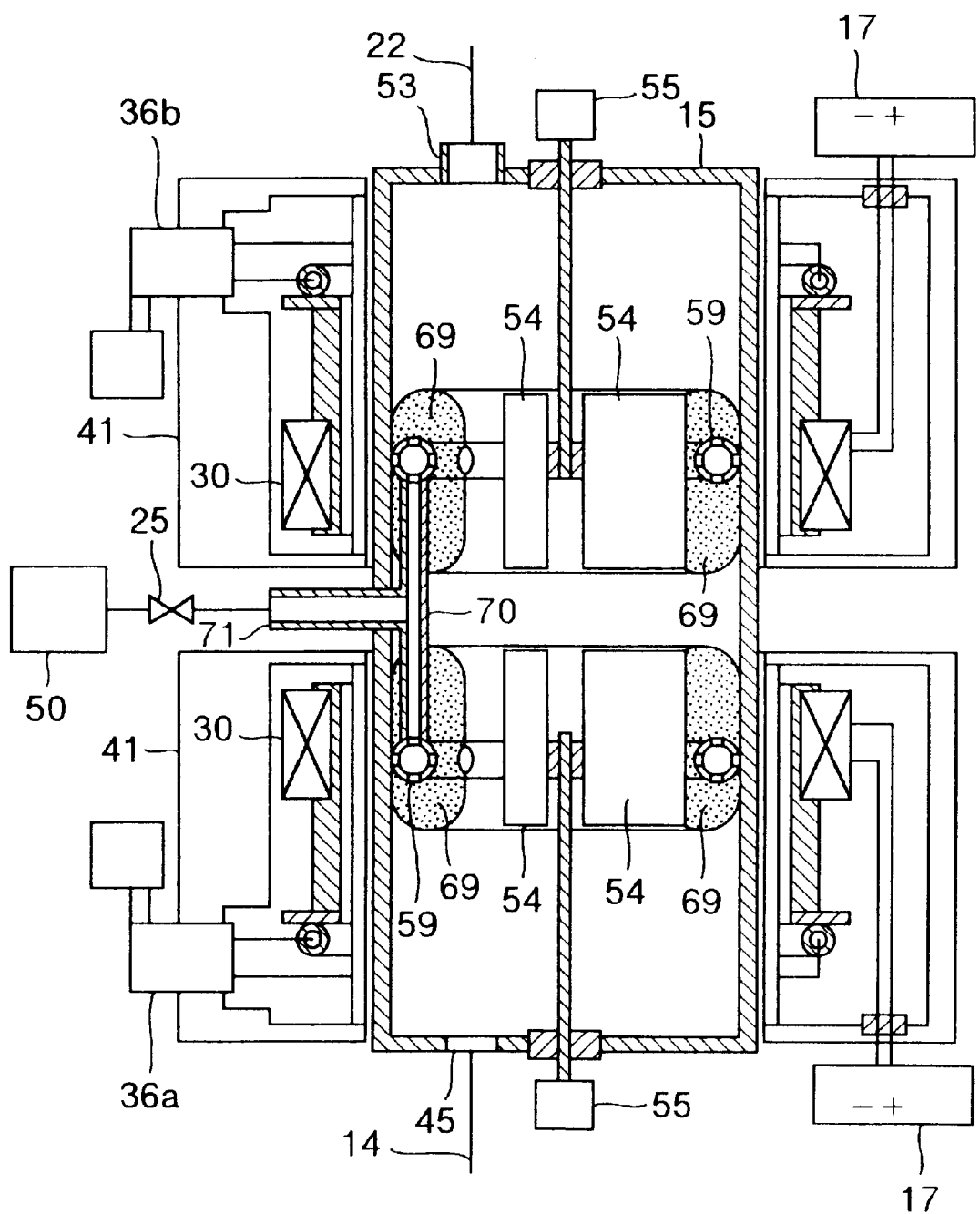
FIG. 8 is a longitudinal sectional view of another magnetic separating portion of the purification apparatus according to the fourth embodiment of the invention.

In the fourth embodiment, the electromagnet 30 for generating the magnetic field is constituted of multiple stages, so that the capture amount of magnetic substances is increased. FIG. 8 is a longitudinal sectional view showing another magnetic separating portion of the purification apparatus according to the fourth embodiment of the invention, in which a discharge pipe of caught magnetic substances is provided between the multi-staged electromagnets.

The modification shown in FIG. 8 is different from the embodiment shown in FIG. 7 in that the annular suction pipe 59 is connected to a discharge pipe 70 which is connected via a nozzle 71 to the concentrated sludge tank 50. The nozzle 71 is disposed in an intermediate position between both the electromagnets 30.

In the modification, a large magnetic gradient is generated in regions 69 whose magnetic fields are opposite to each other. The capture force of magnetic substances is remarkably increased or reinforced. Consequently, the passing rate of water before treated in the magnetic separation container 15 can be increased and the treated amount of raw water can also be increased in the same manner as in the embodiment of FIG. 7.

In the modification shown in FIG. 8, in the intermediate position between the electromagnets 30 in which the nozzle 71 is disposed, the magnetic fields of both the electromagnets are opposed. The intermediate position corresponds to a region in which the magnetic intensity is remarkably reduced. Therefore, in the intermediate position, the magnetic force is hardly exerted on the magnetic substances which flow through the nozzle, the magnetic substances can be discharged with a small discharge power, and energy required for the discharge can be reduced.

In the modification shown in FIG. 8, the electromagnets are cooled by separate refrigerators 36a and 36b, respectively. Even when both the electromagnets and both the thermal shield plates are cooled by one refrigerator, the effect will be the same.

Further, in an alternative to the above embodiment, one electromagnet is provided in the magnetic separation container 15, and instead of the second electromagnet, a high magnetic field generation means may be provided on the upstream side of the treated water in the magnetic separation container 15. For example, a disc-shaped superconductive body may be disposed in the vacuum container, and cooled by the refrigerator to a temperature at which superconductivity is obtained.

The superconductive body has the property of inhibiting a magnetic field from passing through the superconductive body. The magnetic field generated by the electromagnet 30 cannot pass through the superconductive body, and is pushed back toward the magnetic separation container. Therefore, there is generated a region in which magnetic forces acting in the same manner as in the above embodiment balance with each other to set a magnetic force to zero. By disposing the discharge pipe 71 in the region, the power for discharging the magnetic substances can be reduced. Further, the magnetic gradient can be enlarged by the superconductive body which has no coil configuration. The structure can be simplified. The cost for the separation apparatus can be advantageously reduced remarkably. As the superconductive body, for example, an superconductive body of oxide can be used.

Figure 9:
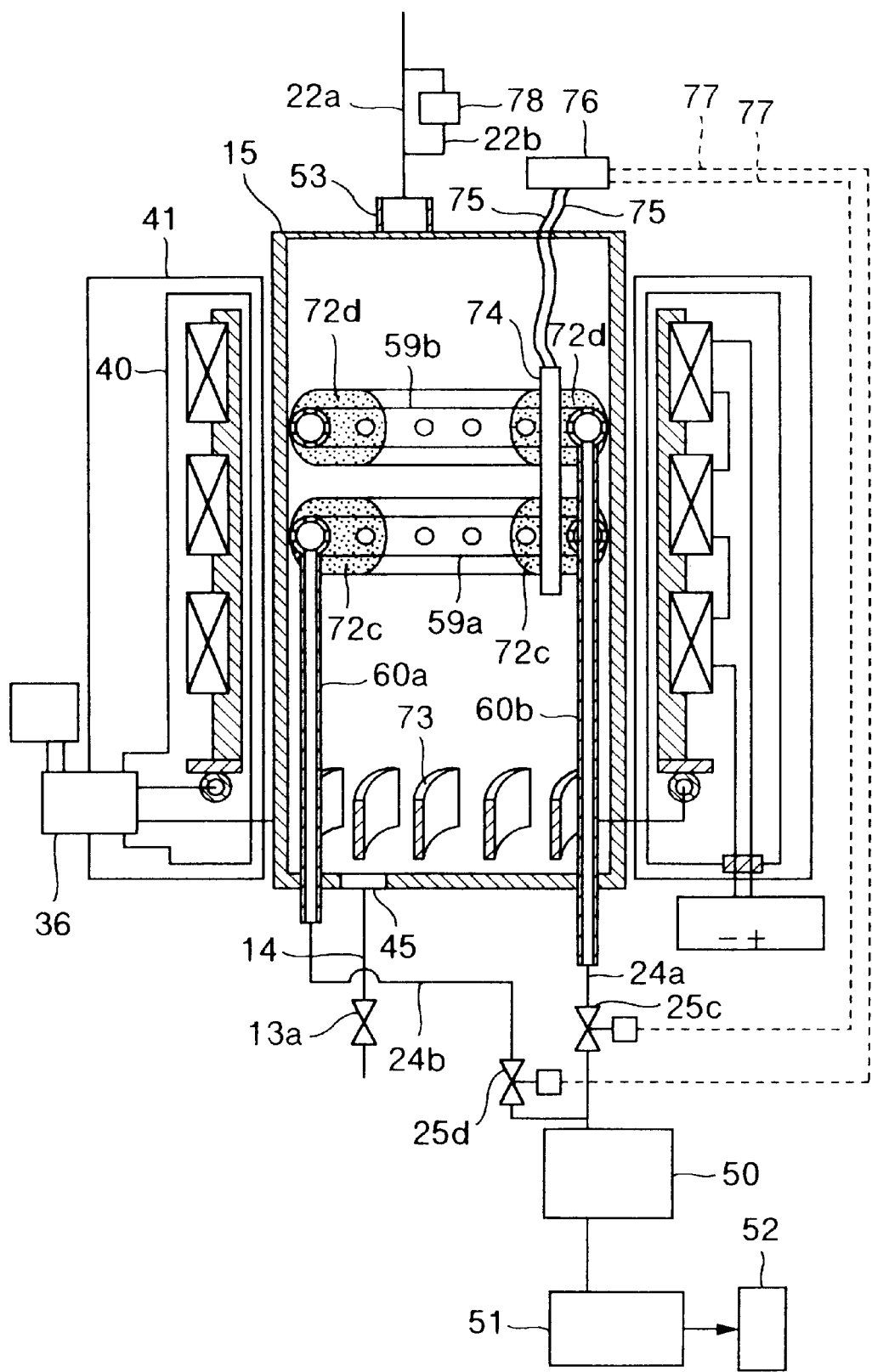
FIG. 9 is a longitudinal sectional view of further magnetic separating portion of the purification apparatus according to the fourth embodiment of the invention.

Further, as shown in FIG. 9, regions 72c and 72d are provided with a magnetic substance sensor 74 which has a light absorbing sensor or a light reflective sensor for detecting existence of magnetic substance group, a sensor for detecting a change in electric conductivity, an image processing sensor and the like. When the magnetic substances are determined to exist in response to the signal from the sensor, electromagnetic valves 25c and 25d may be operated in order that the magnetic substances in the respective regions are discharged to the concentrated sludge tank 50.

Also, an outgoing piping 22a of the magnetic separation container 15 may be provided with a bypass circuit 22b. The bypass circuit 22b is provided with a treated water analyzer which has a magnetic sensor, a mass spectrometer, an elemental analyzer using ultraviolet rays, infrared rays or other rays, a pH meter or another measuring means, and a controller 78, for detecting flowing of magnetic substances or additive agents. In this case, by operating a valve 13a for controlling the flow rate of previously treated water, the flow rate of the previously treated water which flows in the magnetic separation container is controlled. Also, by increasing the amount of electricity from a power supply 17, the magnetic intensity and the magnetic gradient are increased, thereby increasing the magnetic attraction force. The magnetic substances and the agents combined with the magnetic substances may thus be prevented from leaking.

In this constitution, when there is no magnetic substance, no effluent flows into the concentrated sludge tank 50. Therefore, the sludge in the concentrated sludge tank 50 fails to be diluted. The volume of the concentrated sludge tank 50 can be minimized, and the entire apparatus can be made small. Additionally, the amount of the sludge to be treated by the dewatering means 51 is minimized. Therefore, the entire apparatus can be made small, and the operating power can be reduced. Further, by providing the treated water analyzer and the controller 78, the magnetic substances and the agents can be prevented from leaking, which provides the effect that environmental pollution can be prevented. Additionally, the effect resulting from prevention of the leakage can be applied not only to the purification apparatus of the invention but also to another general purification apparatus in which magnetic separation is performed.

Further, as another means for moving the magnetic substances toward the inner wall of the container 15 which has a large magnetic force, there may be provided swirling wings 73 in the vicinity of the treated water inlet port in the magnetic separation container 15, so that the treated water is rotated in a spiral manner in the magnetic separation container 15.

Since the swirling wings 73 are provided, the magnetic substances in the treated water collide against one another or against the swirling wings to become minute. The magnetic substances are then caught in at least one region with a large magnetic gradient which is present in the direction in which the treated water flows, i.e., in the vicinity of the inlet/outlet portion of the electromagnet. On the other hand, the magnetic substances with a larger specific gravity have a small magnetic gradient in the radial direction. Therefore, because of a centrifugal force resulting from rotation of the treated water, the magnetic substances are moved toward the inner wall of the container 15, gathered in the regions 72c and 72d, drawn into perforated annular suction pipes 59a and 59b, and continuously discharged via discharge pipes 60a and 60b, respectively, to the outside of the magnetic separation container 15. The discharge pipes 60 are disposed at predetermined intervals on the circumferential portions of the annular regions to discharge the magnetic substances by using a difference in pressure.

The constitution described above does not require a motor or another rotating machine or an auxiliary machine for mechanically collecting the magnetic substances. The reliability of the apparatus is advantageously enhanced further.

In the fourth embodiment, the provision of the swirling wings has been described, but the inlet port 45 may be disposed in such a manner that the treated water flows in the radial direction of the magnetic separation container 15. Then, for example, a piping is disposed in a spiral manner, so that the treated water is rotated. In this case, the effect will be the same.

As still another means for moving the magnetic substances toward the inner wall of the magnetic separation container 15 on which the magnetic gradient is large, there may be provided a cylindrical or columnar deflector in the central portion of the magnetic separation container 15. The deflector preferably has an outer surface shaped along the inner surface of the magnetic separation container 15.

The central space of the treated water flow path in the magnetic separation container 15 is occupied by the deflector. The treated water flows through between the outer surface of the deflector and the inner surface of the magnetic separation container 15. The deflector preferably has a sufficiently large size, but is sized in such a manner that the treated water fails to be inhibited from flowing. Further, between the outer surface of the deflector and the inner surface of the magnetic separation container 15, there is preferably provided a space in which a suction pipe of magnetic substances can be placed.

In the constitution described above, without the rotary collecting plate, the magnetic substances can be continuously collected toward the inner wall of the container. Therefore, even in the magnetic separation container in which the flow path has a large section, the magnetic substances can be drawn into the suction pipes.

[Fifth Embodiment]

Figure 10:
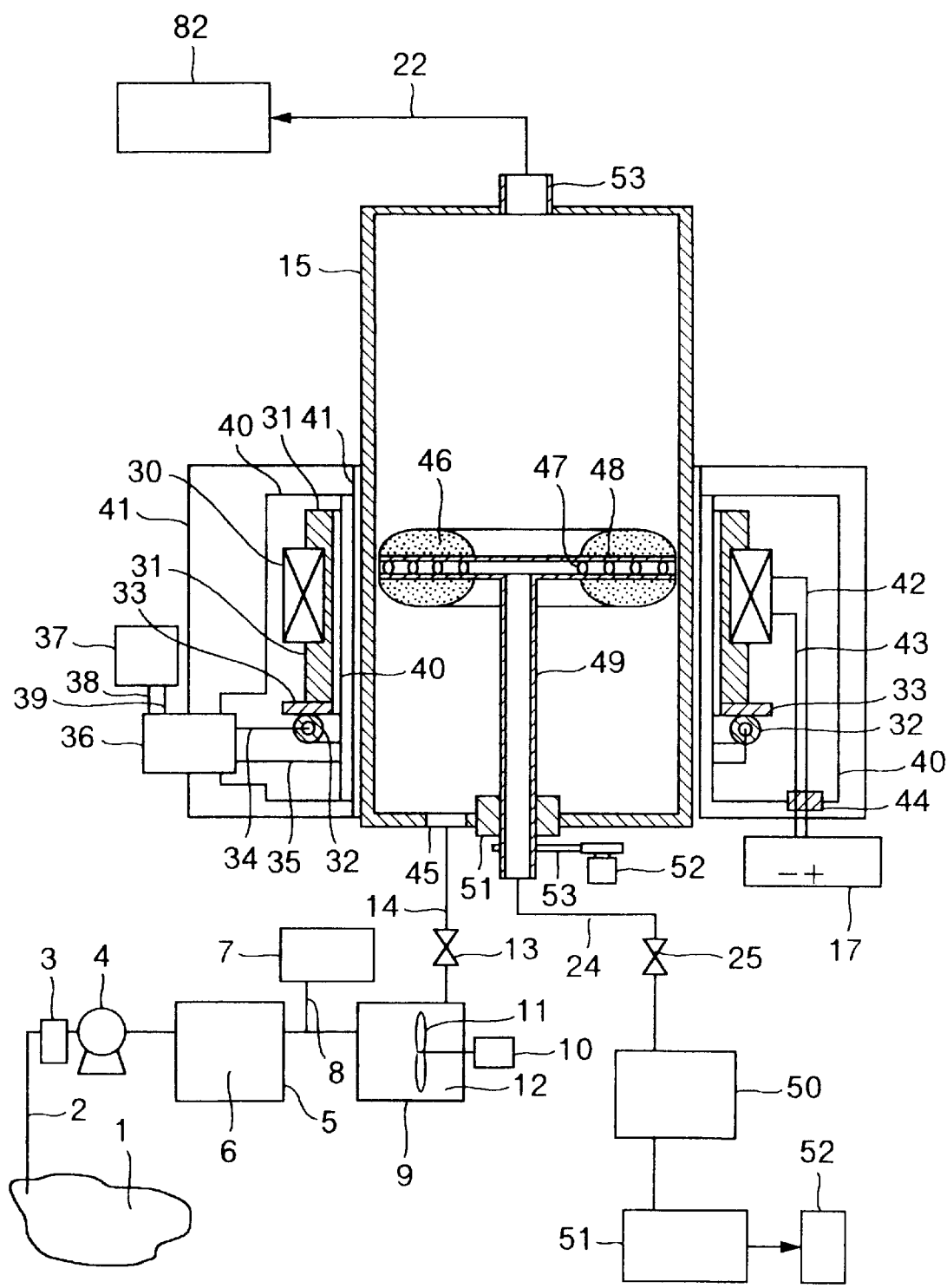
FIG. 10 is a longitudinal sectional view of a magnetic separating portion of a purification apparatus according to a fifth embodiment of the invention.
Figure 11:
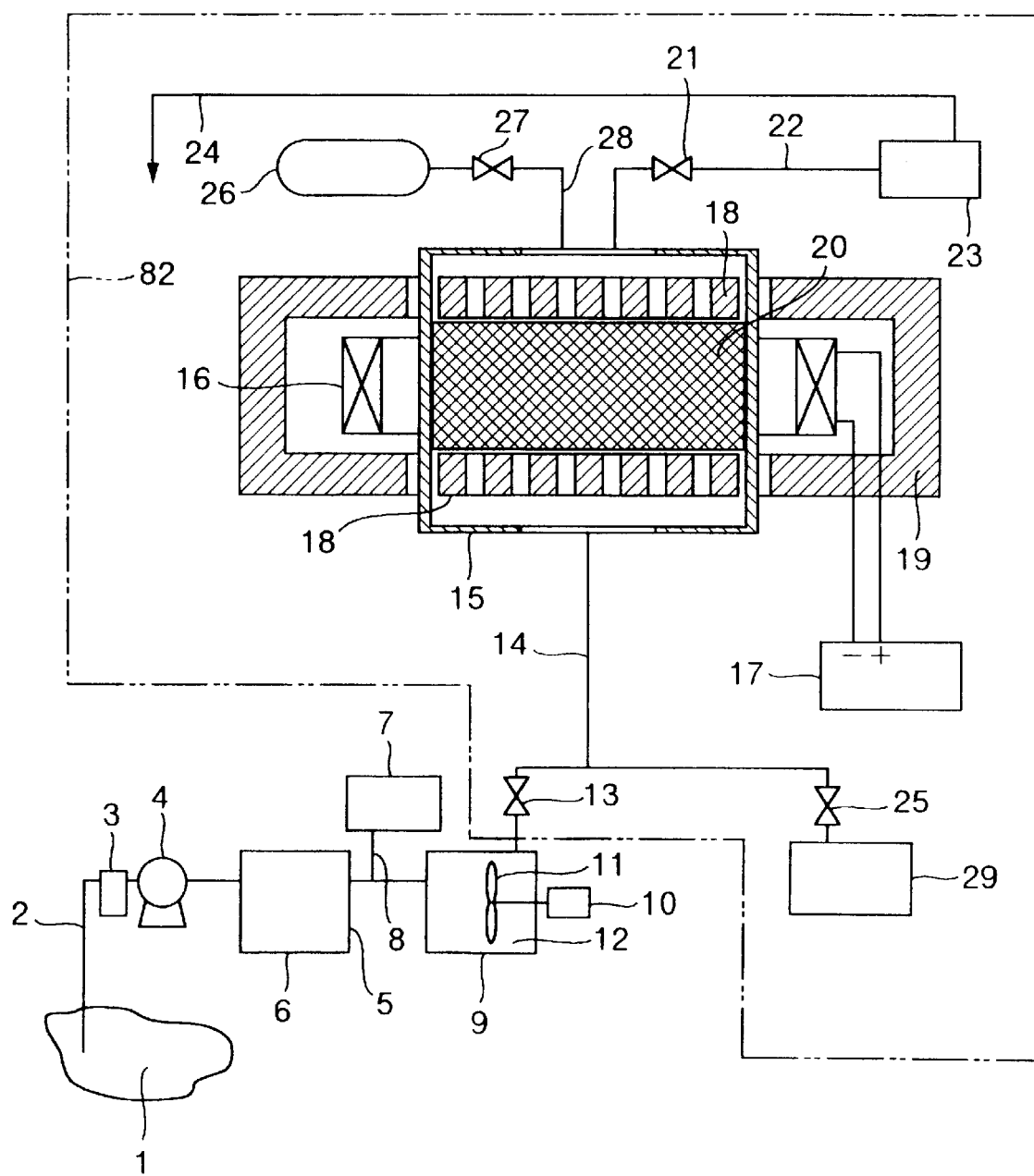
FIG. 11 is a vertical sectional view of a schematic constitution of a conventional magnetic separation apparatus and its magnetic separating portion.

A fifth embodiment of the invention is shown in FIG. 10. The fifth embodiment is different from the embodiment shown in FIG. 1 in that on the downstream side of the magnetic separation container 15 shown in FIG. 1, a magnetic separation apparatus 82 shown in FIG. 11 is placed for performing magnetic separation in multiple stages. The magnetic separation apparatus 82 is provided with a high-gradient magnetic filter and a regenerating function.

The magnetic separation apparatus 82 shown in FIG. 11 is, as known in the art, operated as follows. The reference numerals in FIG. 11 are the same as those in FIGS. 2 and 3.

Raw water in the reservoir 1 is passed from a conduit 2 through a filter 3 for catching large waste, sent by a pump 4 and once stored in a raw water tank 5. Magnetic powder such as iron tetroxide and flocculent such as polychlorinated aluminum are applied to the raw water 6 in the tank through a conduit 8 from an agent adjustment apparatus 7, and stirred in a stirring tank 9 by a stirrer 11 which is rotated by a motor 10, to prepare the water before treated 12 which contains magnetic flocks or substances. The water before treated 12 is passed via a valve 13 through a conduit 14 to flow into the magnetic separation container 15.

A direct-current power is supplied from the direct-current power supply 17 to an air-core coil 16. A magnetic field is generated in proportion to the direct current in the cylindrical magnetic separation container 15, and made uniform by a porous magnetic pole 18 for passing water. The components are surrounded by a yoke 19 made of iron, which is a magnetic line path. The line of magnetic force is prevented from leaking from the yoke. The uniformed magnetic field magnetizes magnetic fine line fillers in the high-gradient magnetic filter 20. The magnetic field in the magnetic separation container 15 is disturbed by the magnetized magnetic fine line fillers. Then, the magnetic flux locally becomes coarse or dense. Multiple regions with a high magnetic gradient are generated.

Here, while the water before treated 12 including the magnetic flocks are fed upwardly form below, the magnetic flocks in the raw water are caught by a large magnetic force on magnetic fine line surfaces of the fillers. The purified raw water is passed as the created water through a valve 21 and the conduit 22, once stored in a treated water tank 23, and returned via the conduit 24 back to the reservoir 1.

After the magnetic flocks are caught in the constant-amount high-gradient magnetic filter 20, to recover the performance of magnetic separation, the backwashing of the filter is performed. For the backwashing, first the valve 13 is closed to stop supplying the water before treated 12. Subsequently, the direct-current power is cut off to eliminate the magnetic field, a predetermined amount of treated water is passed in reverse from the upper portion of the high-gradient magnetic filter 20 via the valve 21, then the valve 25 is opened. Also, at this time, air is supplied from an air tank 26 via a valve 27 and a conduit 28 to perform air bubbling. The magnetic flocks adhering to the magnetic fine line surface are thus washed and removed. The wash water is stored in a backwashing water tank 29. The wash water is later conveyed off the backwashing water tank 29, and discarded to a reclaimed site or the like or burnt.

Subsequently, the valves 25 and 27 are closed. Again, the direct-current power is supplied form the direct-current power supply 17 to the air-core coil 16, then the valve 27 is opened to resume the magnetic separation.

In the constitution combined with the magnetic separation apparatus 82 according to the fifth embodiment, the water flow rate in the magnetic separation container 15 shown in FIG. 10 can be increased.

The reasons for the above are as follows.

When the treated water containing the magnetic substances various in size is passed at a high speed, the magnetic substances which have a small magnetic susceptibility, i.e., contain a small percentage by volume of magnetic powder have a large resistance against the flow for their small magnetic force in the magnetic field. In the high-speed flow, the magnetic force as a braking force becomes smaller than the resistance. Therefore, without being caught in the magnetic separation container, the magnetic substances flow out of the outlet port 53 together with the treated water. However, in the magnetic separation apparatus 82 which is placed on the downstream side of the outlet port 53 and filled with the high-gradient magnetic filter and disposed, since the magnetic gradient on the magnetic filter surface is very large, the flown-out magnetic substances which contain a small percentage of magnetic powder can be caught. Naturally, the flow rate of the magnetic substances to the magnetic separation apparatus 82 is remarkably reduced as compared with the prior-art apparatus. Also, the large magnetic substances which cause the filter to be clogged early are roughly taken in the magnetic separation process of the previous-stage magnetic separation container 15. Therefore, the magnetic substances in the treated water flowing into the magnetic separation apparatus 82 are mainly small-sized.

Consequently, the filter washing cycle of the magnetic separation apparatus 82 is remarkably lengthened. Also, the treated water can be passed at a high speed. The apparatus can be made remarkably small. Alternatively, the magnetic separating portion and the magnetic separating portion with the high-gradient magnetic filter built therein may be placed in the magnetic field of the same electromagnet. In this case, the effect will be the same.

[Sixth Embodiment]

Figure 12:
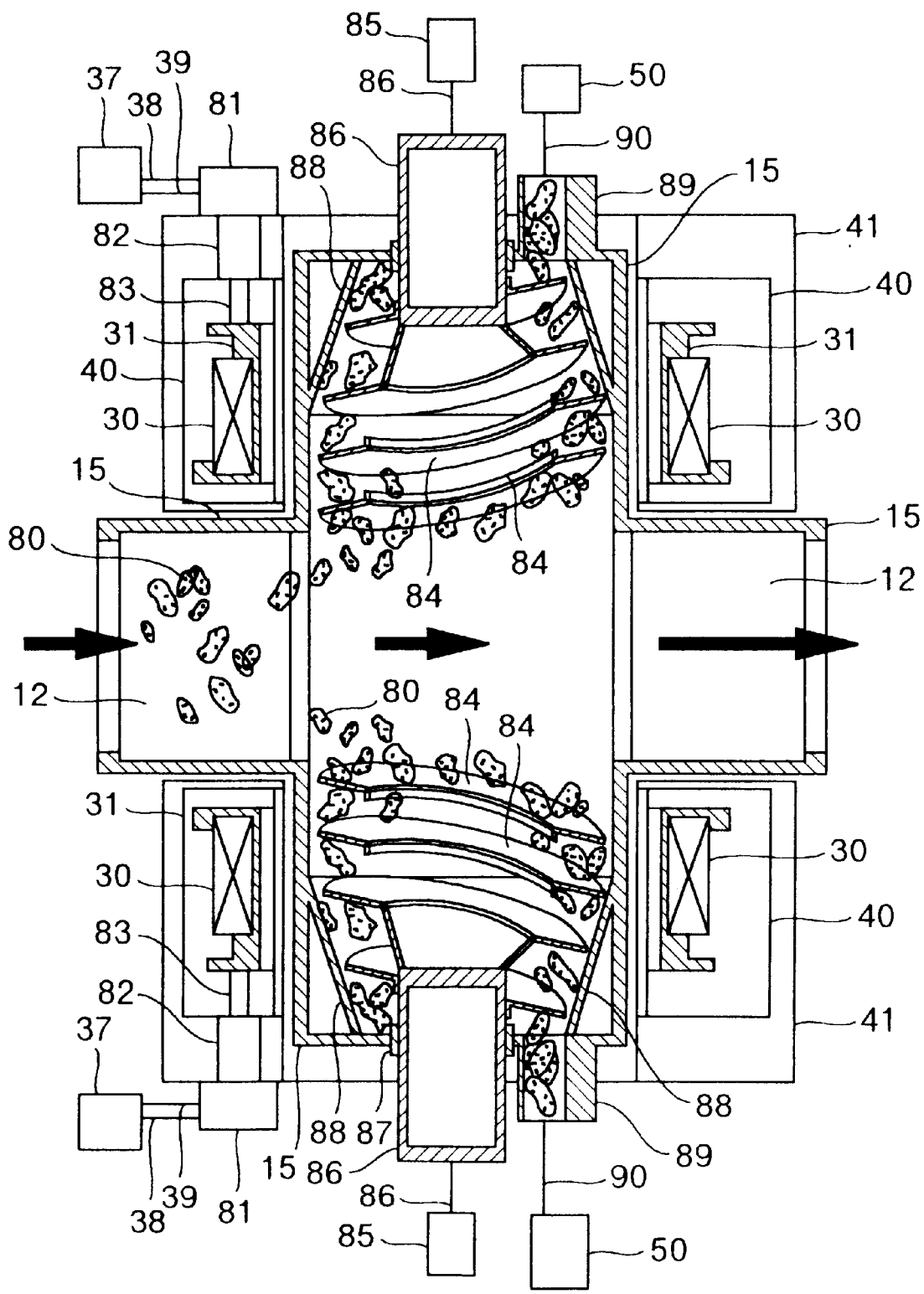
FIG. 12 is a longitudinal sectional view of a magnetic separating portion of a purification apparatus according to a sixth embodiment of the invention.

A sixth embodiment of the invention is shown in FIG. 12. The sixth embodiment is different from the embodiment shown in FIG. 8 in that the water before treated 12 is passed from an intermediate flow portion of the magnetic separation container 15, i.e., from an intermediate portion between two magnets 30 through between the magnets (from the left side as seen in the drawing). The magnets 30 arranged vertically as seen in the drawing in a perpendicular flow path generate a magnetic gradient, and magnetic flocks 80 in the previously treated water 12 are captured by the magnetic attraction force toward the circumferential end portions of the magnets close to the main flow direction of the water before treated (as shown by arrows in the drawing). The caught magnetic flocks are discharged in the direction substantially perpendicular to the main flow direction of the treated water, i.e., via a flow path from the region in which the magnetic gradient is small along the central line of the magnets.

In the sixth embodiment, the magnets 30 are directly cooled by a refrigerator 81 which is of an expander type in Gifford MacMahon system or the like. The thermal shields 40 are cooled to a temperature of about 80K in a first stage 82 of the refrigerator 81, and the bobbins 31 are cooled to a temperature of about 5K in a second stage 83. In each of the stages, direct cooling is performed in thermal contact system.

The captured magnetic flocks 80 are moved in the direction substantially perpendicular to the main flow direction of the water before treated by spiral rotary collecting plates 84 which are placed in the perpendicular flow path and supported by a motor rotation axis 86. The rotation axis 86 and the immobile magnetic separation container 15 are interconnected via a water-tight seal 87. The magnetic flocks 80 moved by the collecting plates 84 are collected by conical guide plates 88 in the vicinity of the central axis of the magnets 30. In the vicinity of the central axis of the magnets 30, the magnetic gradient becomes small, and the acting magnetic force also becomes small. Further, the external force necessary for moving the magnetic flocks becomes small. The magnetic flocks collected around the middle of narrow portions of the conical guide plates 88 are continuously discharged via the flow path leading to a discharge nozzle 89 through a piping 90 to the concentrated sludge tank 50 for storage. The water before treated 12 from which the magnetic flocks have been separated is discharged as the purified water via an outlet port of the magnetic separation container 15 (from the right side as seen in the drawing) from the magnetic separation container 15.

In the sixth embodiment, the magnetic flocks in the water before treated can be effectively separated from the water before treated in the magnetic separation container 15 in FIG. 12, and continuously discharged.

The reasons for the above are as follows.

The main flow direction (as shown by the arrows in the drawing) of the water before treated 12 is substantially perpendicular to the direction in which the magnetic flocks 80 are magnetically drawn and discharged. Therefore, when the magnetic flocks are caught and substantially have a movement speed of zero, the resistance of the main flow of the water before treated against the magnetic flocks is very small. The caught magnetic flocks are prevented from being partially peeled by the flow and drawn back into the flow of the water before treated. The capture efficiency of the magnetic flocks can be enhanced. The caught magnetic flocks are moved substantially perpendicularly to the main flow direction by the collecting plates 84 which constitute the means for moving the magnetic substances. Also in this case, the resistance of the main flow of the water before treated against the magnetic flocks is very small. The caught magnetic flocks are prevented from being partially peeled by the flow and drawn back into the flow of the water before treated. The capture efficiency of the magnetic flocks can be enhanced.

In the process of discharging the magnetic flocks, the magnetic flocks are moved through the space of the region with a small magnetic gradient by the collecting plates 84. Therefore, when collecting the magnetic flocks, the magnetic flocks can be moved without being broken.

Consequently, in the sixth embodiment, the magnetic flocks can be continuously caught and discharged. The separation efficiency can thus be enhanced.

[Seventh Embodiment]

Figure 13:
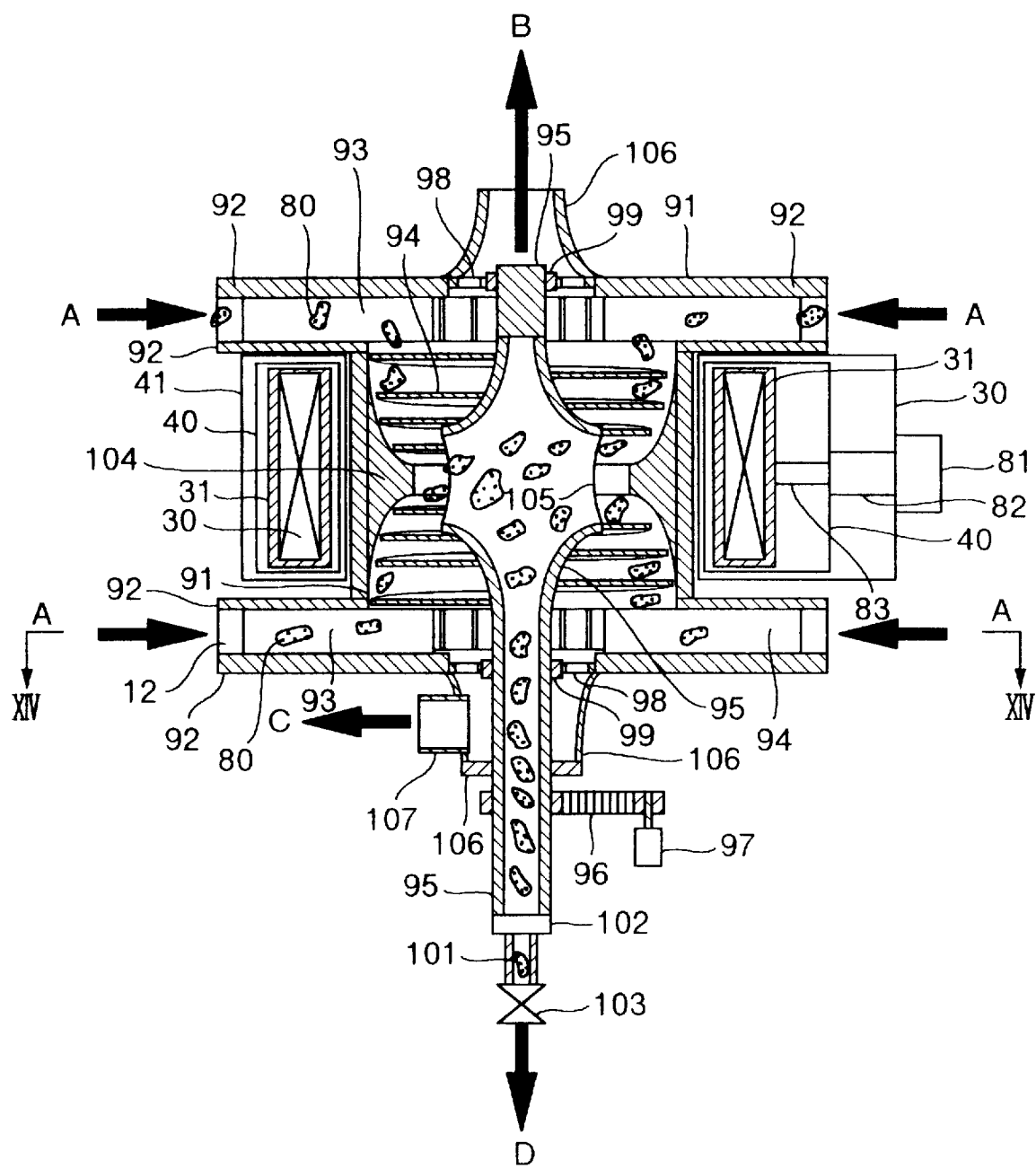
FIG. 13 is a longitudinal sectional view of a magnetic separating portion of a purification apparatus according to a seventh embodiment of the invention.
Figure 14:
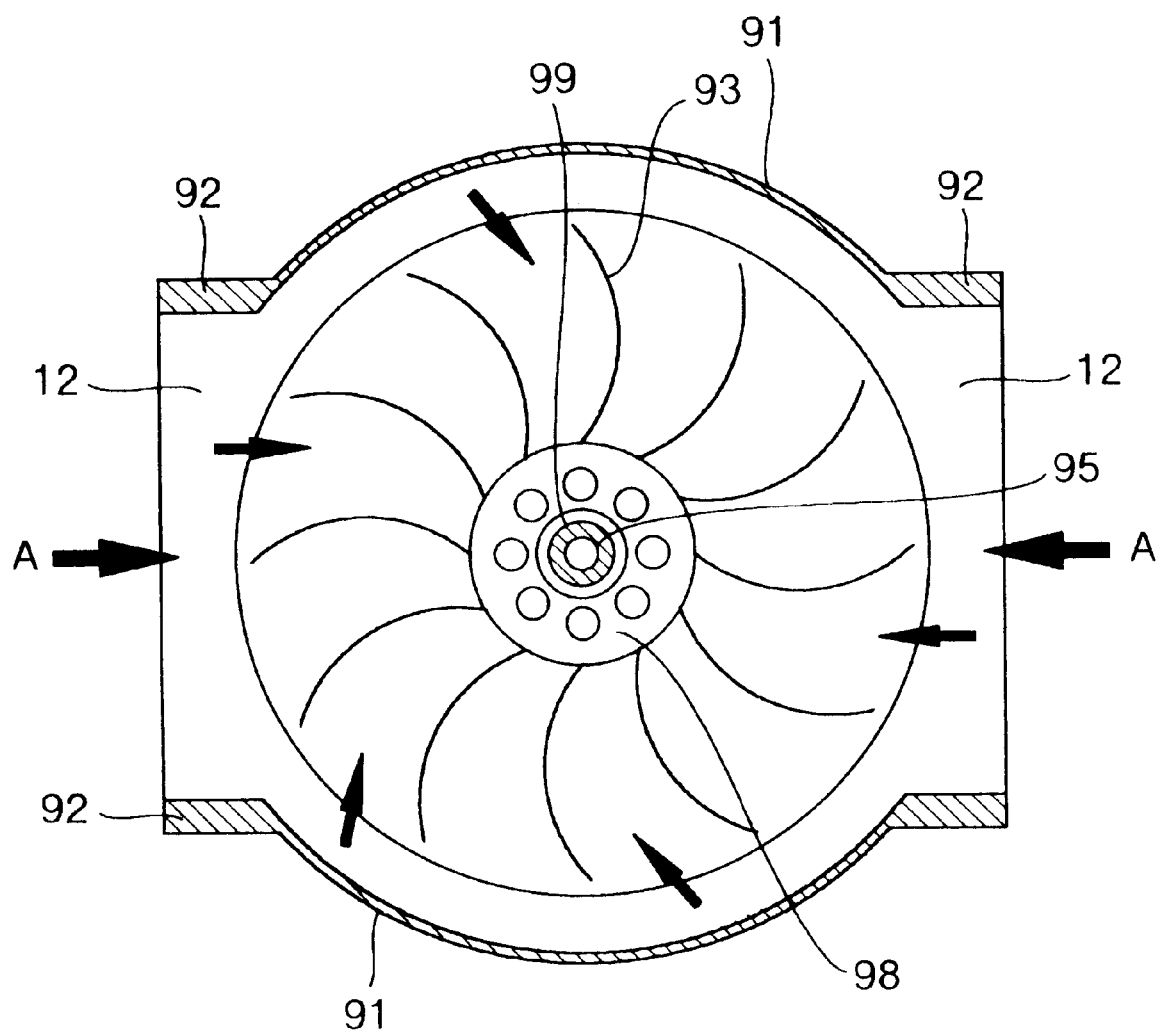
FIG. 14 is a sectional view taken along line XIV—XIV in FIG. 13.

The seventh embodiment of the invention is shown in FIGS. 13 and 14. FIG. 14 shows a section taken along XIV—XIV in FIG. 13. The seventh embodiment is different from the embodiment shown in FIG. 12 in the following respects. Both ends in the axial direction of the magnet 30 are provided with magnetic separation containers 91. Specifically, the magnet 30 is disposed in such a manner that a magnetic field is generated in a flow path perpendicular to the magnetic separation container 91. The water before treated 12 is passed from inlet ports 92 which are formed in outer peripheral end portions of the magnet, in an inner peripheral direction substantially perpendicular to a magnet central axis along spiral guide plates 93 (as shown by arrows A in the drawing). Then, the water before treated is passed along the magnet central axis apart from the magnet (as shown by arrows B and C in the drawing).

Further, the magnetic flocks 80 caught in the both ends of the magnet axis are collected in the central portion of the magnet by spiral rotary collecting disks 94 constituting the moving means, and discharged along the magnet central axial line with a small magnetic gradient to the outside of the magnetic separation containers (as shown by arrow D in the drawing).

The collecting disks 94 are formed integral with a rotation axis 95. The rotation axis 95 is hollowed to form a flow path, and rotated via a belt 96 by a motor 97. Both ends of the rotation axis 95 are supported by bearings 99 which are attached to inner peripheral portions of porous discs 98 fixed to inner walls of the magnetic separators 91. Also, the rotation axis 95 and nozzles 106 attached to the magnetic separators 91 are formed integrally by a water-tight seal 100. The flow path in the rotation axis 95 and a magnetic flock discharge bore 101 are formed integrally by a water-tight seal 102. The magnetic flocks are discharged via a valve 103 to the outside of the magnetic separator.

In the seventh embodiment, the previously treated water 12 which flows via the inlet ports 92 into the magnetic separators 91 is passed along spiral flow paths partitioned by the guide plates 93 through regions having a large magnetic gradient at magnet ends. In this case, the water flows by a longer distance than the distance by which the water linearly flows in the radial direction of the magnet 30. In this structure, the magnetic force is exerted on the magnetic flocks for a longer time as compared with the other structures provided that the amount of the water before treated is constant. Therefore, the capture efficiency by means of the magnetic force is advantageously enhanced. The magnetic flocks 80 caught by means of the magnetic force are collected in the direction substantially perpendicular to the main flow direction of the treated water, i.e., in the central portion with a small magnetic gradient of the magnet 30 along the magnet central axial line by the rotary collecting disks 94 and an immobile guide block 104. The magnetic flocks are passed through magnetic flock drawing ports 105 which open in the flow path in the rotation axis 95, and continuously discharged from the discharge port 101.

The previously treated water from which the magnetic flocks have been separated flows in the direction substantially perpendicular to the inlet flow direction of the treated water, i.e., along the magnet central axial line apart from the magnet, and flows out via bores in the porous discs 98, the nozzle 106 and the nozzle 107.

Consequently, the main flow direction of the previously treated water 12 (as shown by the arrows A in the drawing) is opposite substantially by 180° to the direction in which the magnetic flocks 80 are magnetically drawn and discharged. Therefore, when the magnetic flocks are caught and substantially have a movement speed of zero, the resistance of the main flow of the water before treated against the magnetic flocks is very small. The caught magnetic flocks are prevented from being partially peeled by the flow and drawn back into the flow of the water before treated. The capture efficiency of the magnetic flocks can be enhanced.

In the seventh embodiment, both ends of the magnet 30 have a function of catching and discharging magnetic flocks. Even if only one end of the magnet has the capture/discharge function, the effect will be the same.

According to the invention, there is provided a purification which can continuously separate and remove magnetic substances without performing backwashing.

What is claimed is:
1. A purification apparatus, comprising:
   a first flow path for introducing water which includes magnetic substances or magnetic additives and continuously discharging purified water;
   means for generating a magnetic field in said first flow path;
   a second flow path provided in the magnetic field generated by said magnetic field generation means; and sensing means provided on a downstream side of said magnetic field generation means in said first flow path for sensing said magnetic substances or magnetic additives; and control means for controlling a flow rate of said water in response to a signal from said sensing means.
2. The purification apparatus according to claim 1, further comprising means for moving said magnetic substances in a vicinity of said second flow path.
3. The purification apparatus according to claim 1, wherein a preparatory flow path of said water is placed on an outer peripheral portion of said magnetic field generation means.
4. The purification apparatus according to claim 1, further comprising magnetic substance sensing means provided in said second flow path, and control means for controlling in response to a signal from said sensing means an amount of magnetic substances which flow through said second flow path.
5. The purification apparatus according to claim 1, comprising magnetic separation means provided with a magnetic filter which is connected to a discharge path on a downstream side of said magnetic field generation means in said first flow path.
6. The purification apparatus according to claim 5, comprising magnetic field generating means which is used in common in said magnetic separation means and said magnetic separation means provided with said magnetic filter.
7. The purification apparatus according to claim 1, wherein said first flow path comprises two individual paths, each of the individual paths being adjacent each side of said magnetic field generation means, and the second flow path is located centrally of said magnetic field generation means, whereby the magnetic substances collected by the generated magnetic field in said first flow path are discharged through second flow path.
8. The purification apparatus according to claim 7, wherein said first flow path comprises two individual paths, each of the individual paths being adjacent each side of said magnetic field generation means, and the second flow path is located centrally of said magnetic field generation means, whereby the magnetic substances collected by the generated magnetic field in said first flow path are discharged through the second flow path.
9. The purification apparatus according to claim 7, wherein said first flow path comprises two individual paths, each of the individual paths being adjacent each side of said magnetic field generation means, and the second flow path is located centrally of said magnetic field generation means, whereby the magnetic substances collected by the generated magnetic field in said first flow path are discharged through the second flow path.
10. A purification apparatus, comprising:
    a first flow path for introducing water which includes magnetic substances or magnetic additives and continuously discharging purified water;
    means disposed in said first flow path for generating a magnetic field in said first flow path;

a plurality of regions in which a magnetic gradient is increased are generated in said first flow path;

a plurality of second flow paths are provided in each of magnetic fields generated by the magnetic field generation means; and sensing means provided on a downstream side of said magnetic field generation means in said first flow path for sensing said magnetic substances or magnetic additives; and control means for controlling a flow rate of said water in response to a signal from said sensing means.

11. The purification apparatus according to claim 10 further comprising means for moving said magnetic substances in a vicinity of said second flow paths.

12. The purification apparatus according to claim 10 further comprising magnetic substance sensing means provided in said flow path, and control means for controlling in response to a signal from said sensing means an amount of magnetic substances which flow through said second flow paths.

13. A purification apparatus, comprising:

a first flow path for introducing water which includes magnetic substances or magnetic additives and continuously discharging purified water;

means disposed in said flow path for generating a magnetic field in said first flow path;

a plurality of regions in which a magnetic gradient is increased are generated in said first flow path;

a plurality of second flow paths are provided in each of magnetic fields generated by the magnetic field generation means and are guided to an outside thereof from a region in which the magnetic gradient is decreased, said region being placed between said regions in which the magnetic gradient is increased; sensing means provided on a downstream side of said magnetic field generation means in said first flow path for sensing said magnetic substances or magnetic additives; and control means for controlling a flow rate of said water in response to a signal from said sensing means.

14. The purification apparatus according to claim 13, further comprising means for moving said magnetic substances in a vicinity of said second flow paths.

15. A purification apparatus, comprising:

a first flow path for introducing water which includes magnetic substances or magnetic additives and continuously discharging purified water;

magnetic field generation means provided halfway in said first flow path;

a second flow path is provided in which said magnetic field generation means is disposed in a direction substantially perpendicular to said first flow path, for discharging said magnetic substances in a region in which a magnetic gradient is increased from a region in which said magnetic gradient is decreased; and sensing means provided on a downstream side of said magnetic field generation means in said first flow path for sensing said magnetic substances or magnetic additives; and control means for controlling a flow rate of said water in response to a signal from said sensing means.

16. A purification apparatus, comprising:

a first flow path for introducing water which includes magnetic substances or magnetic additives and discharging purified water;

magnetic field generation means provided halfway in said first flow path;

a second flow path provided in a direction substantially perpendicular to said first flow path, said magnetic field generation means being disposed such that a region in which a magnetic gradient is increased is generated in said second flow path, and said second flow path is guided toward an outside thereof so that said magnetic substances in said region in which the magnetic gradient is increased are discharged from a region in which said magnetic gradient is decreased; and sensing means provided on a downstream side of said magnetic field generation means in said first flow path for sensing said magnetic substances or magnetic additives; and control means for controlling a flow rate of said water in response to a signal from said sensing means.

17. The purification apparatus according to claim 15, wherein said first flow path comprises two individual paths, each of the individual paths being adjacent each side of said magnetic field generation means, and the second flow path is located centrally of said magnetic field generation means, whereby the magnetic substances collected by the generated magnetic field in said first flow path are discharged through the second flow path.

18. The purification apparatus according to claim 15, further comprising means for moving said magnetic substances in said second flow path.

19. The purification process according to claim 16 further comprising means for moving said magnetic substances in said second flow path.

20. The purification apparatus according to claim 16, wherein said first flow path comprises two individual paths, each of the individual paths being adjacent each side of said magnetic field generation means, and the second flow path is located centrally of said magnetic field generation means, whereby the magnetic substances collected by the generated magnetic field in said first flow path are discharged through the second flow path.

21. A purification apparatus, comprising:

a first flow path for introducing water which includes magnetic substances or magnetic additives and continuously discharging purified water;

magnetic field generation means of disposed in said first flow path, wherein said first flow path includes two flow paths which are interconnected via a flow path in which said magnetic field generation means is disposed, and a region in which a magnetic gradient is increased is generated in one of the two flow paths;

a second flow path provided in the magnetic filed generated by said magnetic field generation means and guided toward an outside thereof from a region in which the magnetic gradient is decreased; and sensing means provided on a downstream side of said magnetic field generation means in said first flow path for sensing said magnetic substances or magnetic additives; and control means for controlling a flow rate of said water in response to a signal from said sensing means.

22. The purification apparatus according to claim 21, further comprising means for moving said magnetic substances in one of the two flow paths in which said magnetic field generation means is disposed.

23. The purification apparatus according to claim 21, wherein said first flow path comprises two individual paths, each of the individual paths being adjacent each side of said magnetic field generation means, and the second flow path is located centrally of said magnetic field generation means, whereby the magnetic substances collected by the generated magnetic field in said first flow path are discharged through the second flow path.

* * * * *